United States Patent
Li et al.

(10) Patent No.: US 11,082,095 B2
(45) Date of Patent: Aug. 3, 2021

(54) METHOD AND APPARATUS FOR TRIGGERING A BEAM STATE INFORMATION REPORT IN A WIRELESS COMMUNICATION SYSTEM

(71) Applicant: ASUSTeK Computer Inc., Taipei (TW)

(72) Inventors: Ming-Che Li, Taipei (TW); Ko-Chiang Lin, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 146 days.

(21) Appl. No.: 15/879,790

(22) Filed: Jan. 25, 2018

(65) Prior Publication Data

US 2018/0212651 A1    Jul. 26, 2018

Related U.S. Application Data

(60) Provisional application No. 62/450,467, filed on Jan. 25, 2017.

(51) Int. Cl.
*H04B 7/0417* (2017.01)
*H04B 7/06* (2006.01)
(Continued)

(52) U.S. Cl.
CPC ......... *H04B 7/0417* (2013.01); *H04B 7/0686* (2013.01); *H04B 7/0695* (2013.01);
(Continued)

(58) Field of Classification Search
CPC .. H04B 7/0417; H04B 7/0632; H04B 7/0686; H04B 7/0695; H04B 7/088; H04W 16/28;
(Continued)

(56) References Cited

U.S. PATENT DOCUMENTS

| | | |
|---|---|---|
| 2012/0113816 A1 | 5/2012 | Bhattad |
| 2013/0102345 A1 | 4/2013 | Jung |

(Continued)

FOREIGN PATENT DOCUMENTS

| | | |
|---|---|---|
| WO | 2015093559 | 6/2015 |
| WO | 2016169598 | 10/2016 |

(Continued)

OTHER PUBLICATIONS

Huawei, CSI-RS design for beam management, R1-1700069, Jan. 2017, 3GPP TSG RAN WG1 (Year: 2017).*

(Continued)

*Primary Examiner* — Harun Chowdhury

(74) *Attorney, Agent, or Firm* — Skaar Ulbrich Macari, P.A.

(57) ABSTRACT

Methods and apparatuses for beam management with user equipment beam sweeping in a wireless communication system are disclosed herein. In one method, a network node transmits a reference signal for beam management within one occasion, wherein the occasion comprises at least M symbol sets. The network node performs beam sweeping for transmitting the reference signal in a first symbol set of the M symbol sets. The network node repeats the beam sweeping for transmitting the reference signal in the rest of the M symbol sets.

20 Claims, 25 Drawing Sheets

(51) Int. Cl.
*H04B 7/08* (2006.01)
*H04W 72/08* (2009.01)
*H04W 72/12* (2009.01)
*H04B 7/0404* (2017.01)

(52) U.S. Cl.
CPC .......... *H04B 7/088* (2013.01); *H04B 7/0404* (2013.01); *H04B 7/063* (2013.01); *H04B 7/0632* (2013.01); *H04W 72/085* (2013.01); *H04W 72/1289* (2013.01)

(58) Field of Classification Search
CPC ........................ H04W 24/10; H04W 72/085; H04W 72/1289
USPC ........................................ 370/252, 329, 332
See application file for complete search history.

(56) References Cited

U.S. PATENT DOCUMENTS

| | | | |
|---|---|---|---|
| 2013/0223251 A1 | 8/2013 | Li | |
| 2013/0237218 A1 | 9/2013 | Li | |
| 2016/0150435 A1 | 5/2016 | Baek | |
| 2016/0165458 A1* | 6/2016 | Peng | H04W 16/28 370/329 |
| 2019/0110210 A1* | 4/2019 | Takeda | H04W 16/28 |
| 2020/0145079 A1* | 5/2020 | Marinier | H04B 7/0695 |

FOREIGN PATENT DOCUMENTS

| | | |
|---|---|---|
| WO | 2016187744 | 12/2016 |
| WO | 2017030602 | 2/2017 |
| WO | 2017164220 | 9/2017 |

OTHER PUBLICATIONS

Office Action from Japan Patent Office in corresponding JP Application No. 2018-010139, dated Feb. 5, 2019.
Office Action from Taiwan Intellectual Patent Office in corresponding TW Application No. 107102785, dated Jan. 28, 2019.
Huawei et al., R1-1700069, CSI-RS design for beam management, 3GPP TSG RAN WG1 #AH, 3GPP Server Publication Date (Jan. 9, 2017).
Office Action from Korean Intellectual Property Office in corresponding KR Application No. 10-2018-0009621, dated Apr. 22, 2019.
Samsung: "The Impact of Beam Sweeping on RRM Measurement", 3GPP Draft; R2-1700606—The Impact of Beam Sweeping on RRM Measurement, 3rd Generation Partnership Project (3GPP), Mobile Competence Centre ; 650, Route Des Lucioles ; F-06921 Sophia-Antipolis Cedex vol. RAN WG2, No. Spokane, USA; Jan. 17, 2017-Jan. 19, 2017 Jan. 17, 2017 (Jan. 17, 2017), XP051211178, Retrieved from the Internet: URL:http://www.3gpp.org/ftp/Meetings_3GPP_SYNC/RAN2/Docs/.
European Search Report from corresponding EP Application No. 18153345.6, dated Jun. 18, 2018.
Office Action from Intellectual Property India in corresponding IN Application No. 201814002966, dated Mar. 9, 2020.

* cited by examiner

| Value of BRRS resource allocation field | Description | |
|---|---|---|
| | Subframe type allocation | Symbol type allocation |
| '00' | 5 symbols in slot 0 | 13$^{th}$ symbol |
| '01' | 5 symbols in slot 1 | 14$^{th}$ symbol |
| '10' | 10 symbols | 13 & 14$^{th}$ symbols |
| '11' | Reserved | Reserved |

| Value of BRRS process indication field | Description |
|---|---|
| '00' | The first BR process configured by the higher layers |
| '01' | The second BR process configured by the higher layers |
| '10' | The third BR process configured by the higher layers |
| '11' | The fourth BR process configured by the higher layers |

FIG. 14 (PRIOR ART)

| | Description | Bit length |
|---|---|---|
| BRRS resource ID 0, BRRS resource ID 1, ..., BRRS resource ID 7 | Antenna Ports to be measured for each BRRS resource (up to 8 ports) (8 bit bitmap for ports 600 to 607). | 8*8=64bits |
| Resource allocation type | 0 : subframe type allocation<br>1 : symbol type allocation | 1 bits |
| VCID | Virtual cell ID | 9 bits |

FIG. 15 (PRIOR ART)

| BRSRP index | Measured quantity value [dBm] |
|---|---|
| 0 | BRSRP < -140 |
| 1 | -140 ≤ BRSRP < -139 |
| 2 | -139 ≤ BRSRP < -138 |
| ... | ... |
| 95 | -46 ≤ BRSRP < -45 |
| 96 | -45 ≤ BRSRP < -44 |
| 97 | -44 ≤ BRSRP |

FIG. 16 (PRIOR ART)

| Reported value | Measured quantity value | Unit |
|---|---|---|
| 0 | BRRS-RP < -140 | dBm |
| 1 | -140 ≤ BRRS-RP < -139 | dBm |
| 2 | -139 ≤ BRRS-RP < -138 | dBm |
| ... | ... | ... |
| 95 | -46 ≤ BRRS-RP < -45 | dBm |
| 96 | -45 ≤ BRRS-RP < -44 | dBm |
| 97 | -44 ≤ BRRS-RP | dBm |

FIG. 17 (PRIOR ART)

| BRRS-RI | BRRS resource ID |
|---|---|
| 0 | 0 |
| 1 | 1 |
| 2 | 2 |
| 3 | 3 |
| 4 | 4 |
| 5 | 5 |
| 6 | 6 |
| 7 | 7 |

| BRS configuarion (Indication bits) | BRS transmission period | Maximum # of beam training opportunities | Logical beam index |
|---|---|---|---|
| 00 | 1 slot < 5ms | $P \cdot N_{symb}^{DL}$ | $i = 0, ..., 1 \cdot P \cdot N_{symb}^{DL} - 1$ |
| 01 | 1 subframe = 5ms | $2 \cdot P \cdot N_{symb}^{DL}$ | $i = 0, ..., 2 \cdot P \cdot N_{symb}^{DL} - 1$ |
| 10 | 2 subframes = 10ms | $4 \cdot P \cdot N_{symb}^{DL}$ | $i = 0, ..., 4 \cdot P \cdot N_{symb}^{DL} - 1$ |
| 11 | 4 subframes = 20ms | $8 \cdot P \cdot N_{symb}^{DL}$ | $i = 0, ..., 8 \cdot P \cdot N_{symb}^{DL} - 1$ |

METHOD AND APPARATUS FOR TRIGGERING A BEAM STATE INFORMATION REPORT IN A WIRELESS COMMUNICATION SYSTEM

CROSS-REFERENCE TO RELATED APPLICATIONS

The present application claims the benefit of U.S. Provisional Patent Application Ser. No. 62/450,467 filed on Jan. 25, 2017, the entire disclosure of which is incorporated herein in its entirety by reference.

FIELD

This disclosure generally relates to wireless communication networks, and more particularly, to a method and apparatus for beam management with user equipment (UE) beamforming in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for beam management with user equipment beam sweeping in a wireless communication system are disclosed herein. In one method, a network node transmits a reference signal for beam management within one occasion, wherein the occasion comprises at least M symbol sets. The network node performs beam sweeping for transmitting the reference signal in a first symbol set of the M symbol sets. The network node repeats the beam sweeping for transmitting the reference signal in the rest of the M symbol sets.

BRIEF DESCRIPTION OF THE DRAWINGS

FIG. 14 is a reproduction of Table 5.2-2 from KT 5G-SIG TS 5G.213 v1.9 illustrating BRRS process indication field for xPDCCH with DL or UL DCI.
FIG. 15 is a reproduction of Table 5.2-3 from KT 5G-SIG TS 5G.213 v1.9 illustrating BR process configuration.
FIG. 16 is a reproduction of Table 8.3.3.1-1 from KT 5G-SIG TS 5G.213 v1.9 illustrating a 7-bit BRSRP Table.
FIG. 17 is a reproduction of Table 8.4.3.1-1 from KT 5G-SIG TS 5G.213 v1.9 illustrating a 7-bit BRRS-RP mapping.
FIG. 22 illustrates a table showing a maximum number of beam training opportunities in one beam reference signal occasion.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts"; R2-163716, "Discussion on terminology of beamforming based high frequency NR"; R2-162709, "Beam support in NR"; R2-162762, "Active Mode Mobility in NR: SINR drops in higher frequencies"; R3-160947, TR 38.801 V0.1.0, "Study on New Radio Access Technology; Radio Access Architecture and Interfaces"; R2-164306, "Summary of email discussion [93bis#23][NR] Deployment scenarios"; RAN2#94 meeting minutes; R2-162251, "RAN2 aspects of high frequency New RAT"; R2-163879, "RAN2 Impacts in HF-NR"; R2-162210, "Beam level management <-> Cell level mobility"; R2-163471, "Cell concept in NR". Additionally, the exemplary wireless communications systems devices may be designed to support the KT PyeongChang 5G Special Interest Group (KT 5G-SIG) standards, including: TS 5G.213 v1.9, "KT 5G Physical layer procedures (Release 1)"; TS 5G.321 v1.2, "KT 5G MAC protocol specification (Release 1)"; TS 5G.211 v2.6, "KT 5G Physical channels and modulation (Release 1)" and TS 5G.331 v1.0, "KT 5G Radio Resource Control (RRC) Protocol specification (Release 1)". The standards and documents listed above are hereby expressly incorporated by reference in their entirety.

Figure 1:
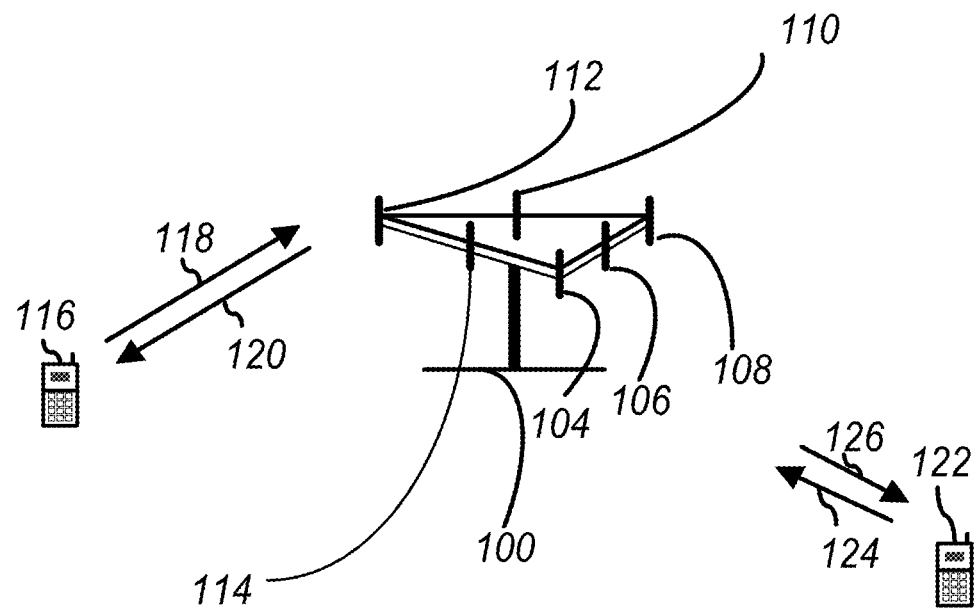
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
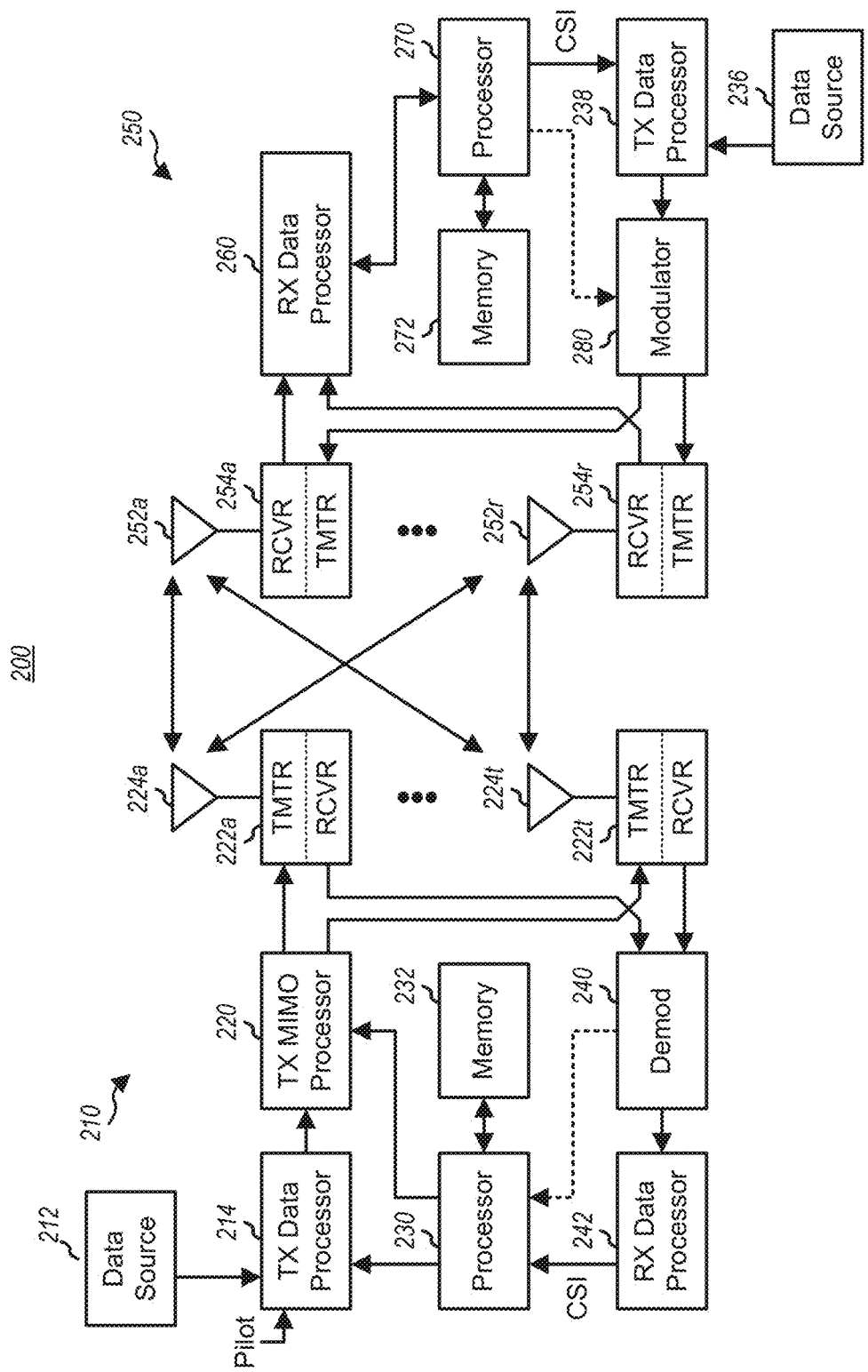
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
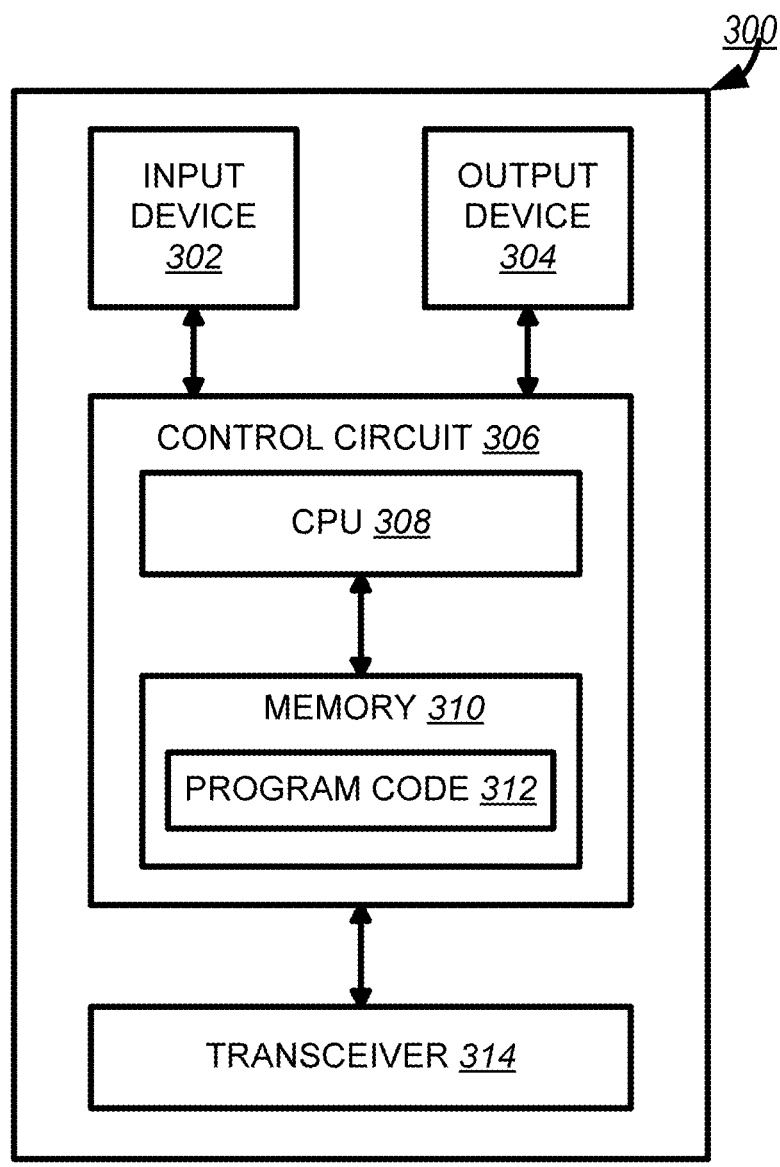
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
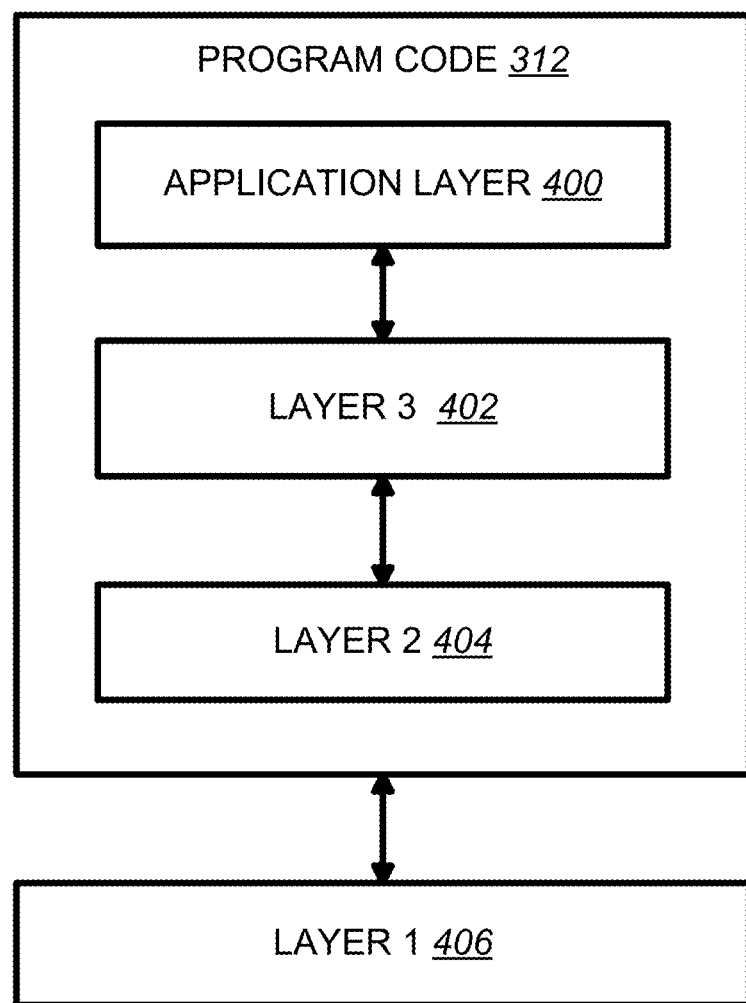
FIG. 4 is a functional block diagram of the program code of FIG. 3 according to one exemplary embodiment.
Figure 5A:
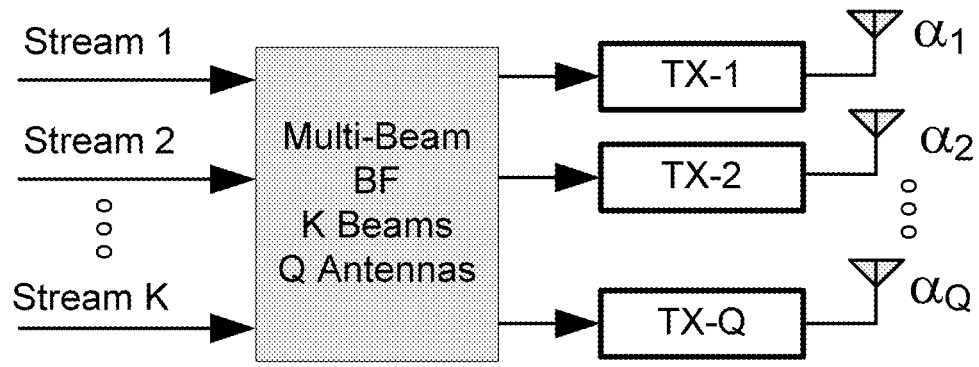
FIG. 5A is an example of digital beamforming.
Figure 5B:
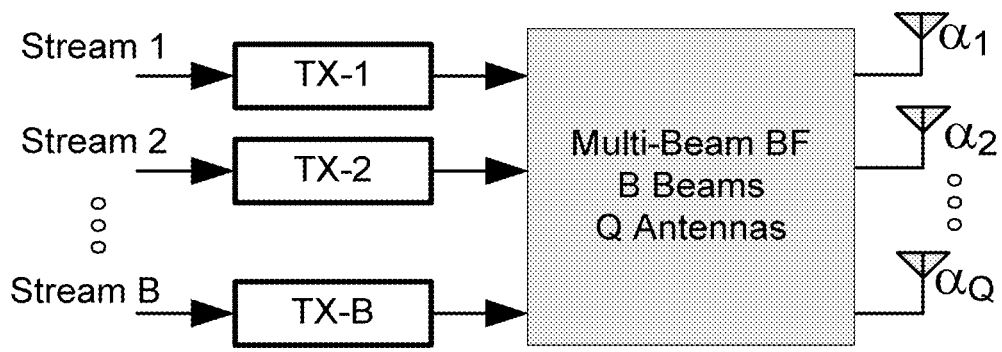
FIG. 5B is an example of analogue beamforming.
Figure 5C:
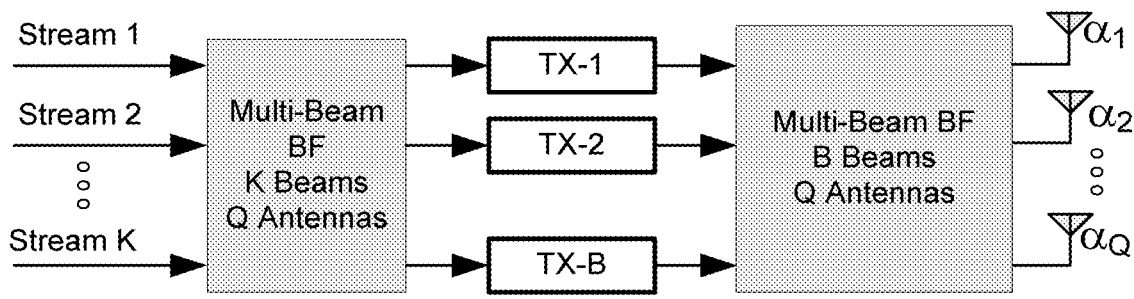
FIG. 5C is an example of hybrid beamforming, fully connected.
Figure 5D:
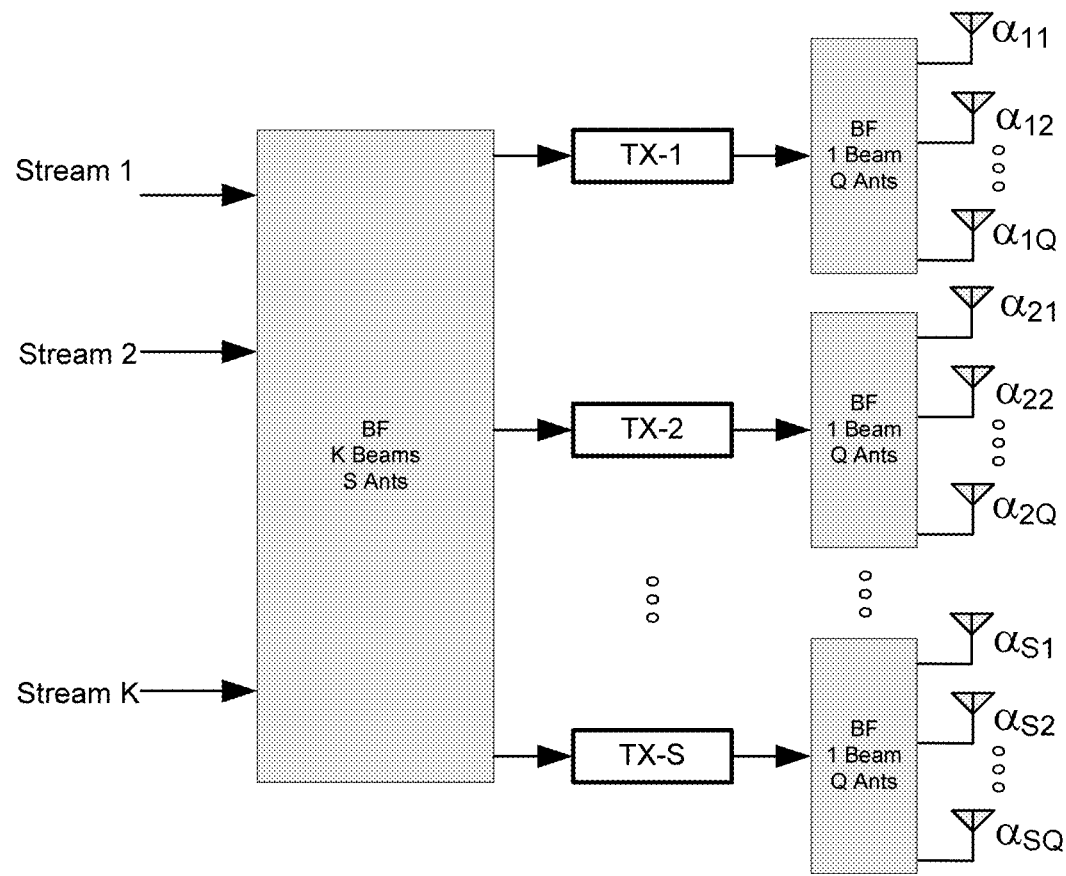
FIG. 5D is an example of hybrid beamforming, sub-array.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020:

eMBB (enhanced Mobile Broadband)
mMTC (massive Machine Type Communications)
URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

As described in 3GPP R2-162366, in lower frequency bands (e.g. current LTE bands <6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence, the high gain beams are narrow compared to a wide sector beam so multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

As described in 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be categorized into three types of implementation: digital beamforming, hybrid beamforming, and analog beamforming. For digital beamforming, the beam is generated on the digital domain. That is, the weighting of each antenna element can be controlled by a baseband (e.g., connected to a transceiver unit (TXRU)). Therefore, it is very easy to tune the beam direction of each sub-band differently across the system bandwidth. Also, changing beam direction from time to time does not require any switching time between orthogonal frequency-division multiplexing (OFDM) symbols. All beams whose directions cover the whole coverage can be generated simultaneously. However, this structure requires (almost) one-to-one mapping between the TXRU (transceiver/RF chain) and the antenna element. This structure can become quite complicated as the number of antenna element increases and the system bandwidth increases let alone the existence of heat problems. For analog beamforming, the beam is generated on the analog domain, i.e. the weighting of each antenna element can be controlled by an amplitude/phase shifter in the radiofrequency (RF) circuit. Since the weighing is purely controlled by the circuit, the same beam direction would apply on the whole system bandwidth. Also, if beam direction is to be changed, switching time is required. The number of beam generated simultaneous by an analog beamforming depends on the number of TXRU. It is noted that for a given size of an array, the increase of TXRU may decrease the antenna element of each beam, such that a wider beam would be generated. In short, analog beamforming could avoid the complexity and heat problem of digital beamforming even though it is more restricted in operation. Hybrid beamforming can be considered as a compromise between analog and digital beamforming, in which the beam can come from both analog and digital domain. The three types of beamforming are shown in FIGS. 5A-5D.

Figure 6:
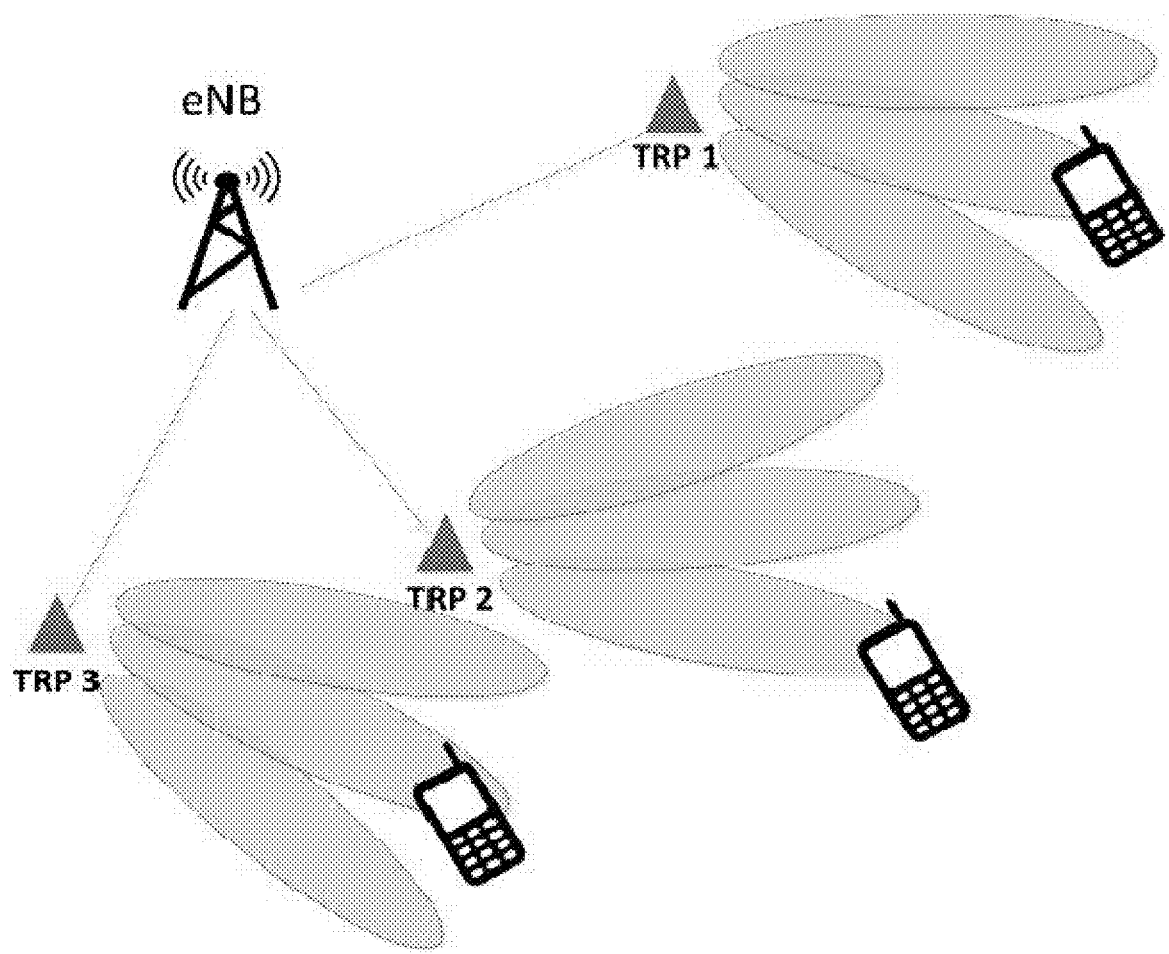
FIG. 6 illustrates a beam concept in 5G as shown in 3GPP R2-162709

Based on 3GPP R2-162709 and as shown in FIG. 6, an eNB may have multiple Transmission/Reception Points (TRPs) (either centralized or distributed). Each TRP can form multiple beams. The number of beams and the number of simultaneous beams in the time/frequency domain depend on the number of antenna array elements and the radiofrequency (RF) at the TRP.

Potential mobility type for New RAT (NR) can be listed as follows: intra-TRP mobility; inter-TRP mobility; and inter-NR eNB mobility.

Based on 3GPP R2-162762, reliability of a system purely relying on beamforming and operating in higher frequencies might be challenging, since the coverage might be more sensitive to both time and space variations. As a consequence of that the Signal to Interference plus Noise Ratio (SINR) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

Figure 7:
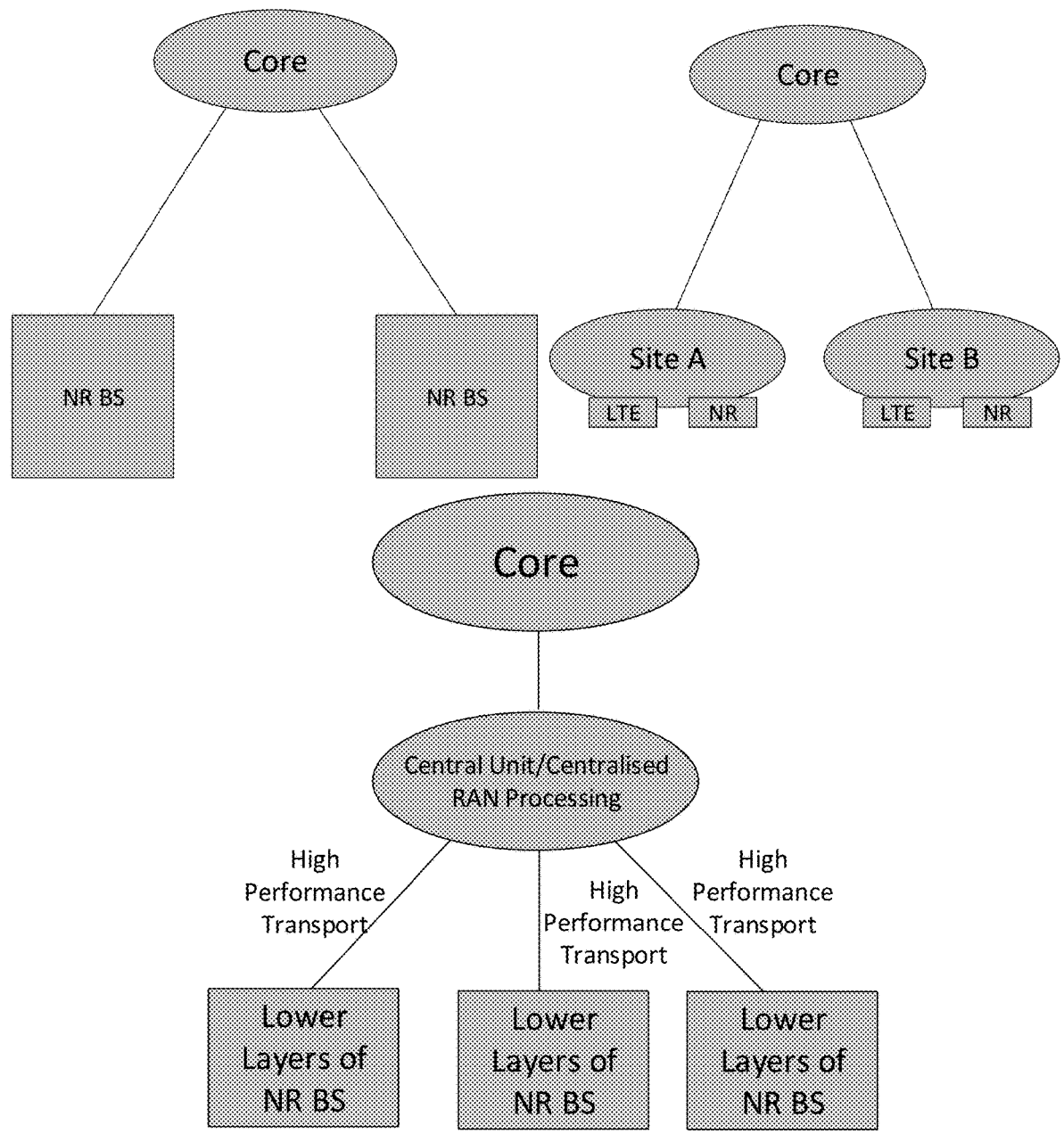
FIG. 7 illustrates stand-alone, co-sited with LTE, and a centralized baseband as shown in 3GPP R3-160947, TR 38.801 V0.1.0.
Figure 8:
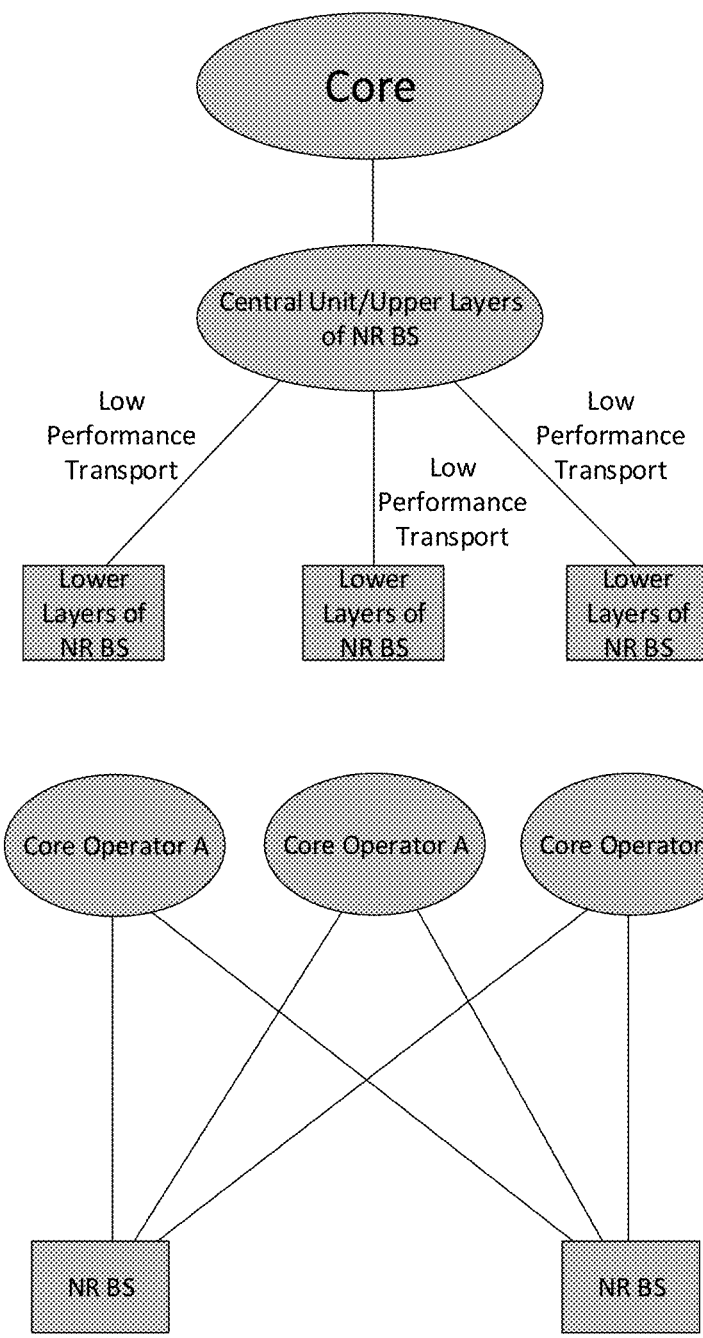
FIG. 8 illustrates a centralized baseband with low performance transport and shared RAN as shown in 3GPP R3-160947, TR 38.801 V0.1.0.

Based on 3GPP R3-160947, TR 38.801 V0.1.0, the scenarios illustrated in FIGS. 7 and 8 should be considered for support by the NR radio network architecture.

Based on 3GPP R2-164306, the following scenarios in terms of cell layout for standalone NR are captured to be studied: macro cell only deployment; heterogeneous deployment; and small cell only deployment.

Based on 3GPP RAN2#94 meeting minutes, 1 NR eNB (e.g. called gNB) corresponds to 1 or many TRPs. Two levels of network controlled mobility: Radio Resource Control (RRC) driven at a "cell" level, and Zero/Minimum RRC involvement (e.g. at Medium Access Control (MAC)/Physical (PHY)).

Figure 9:
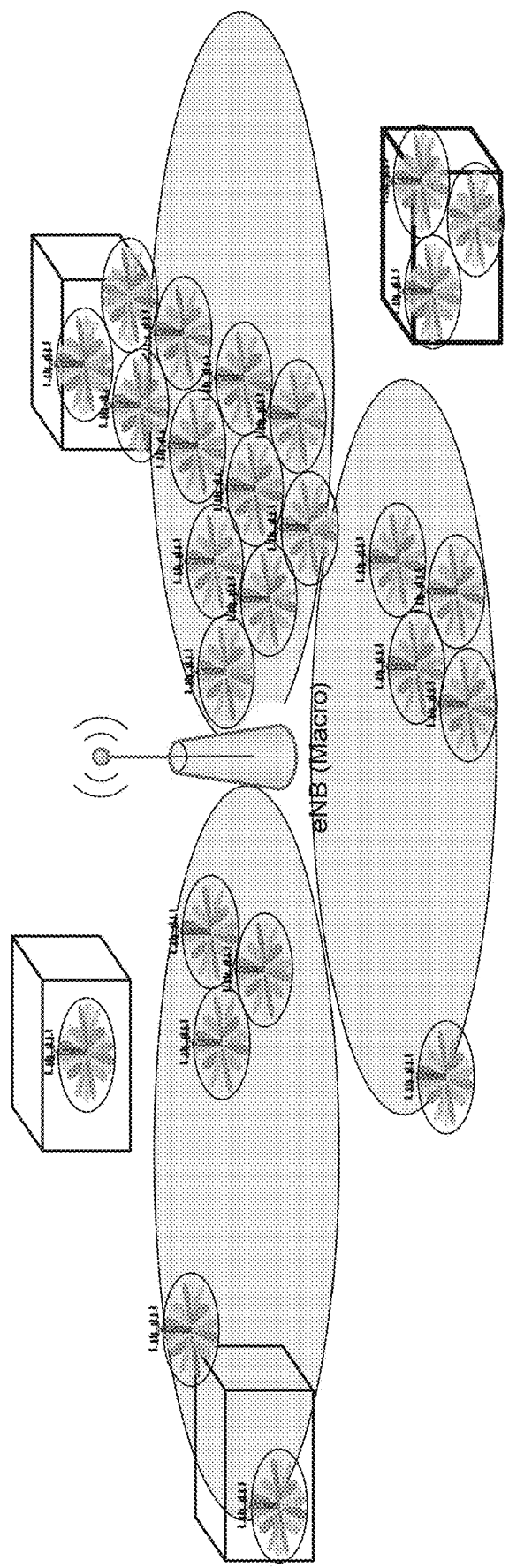
FIG. 9 illustrates different deployment scenarios with a single TRP cell as shown in 3GPP R2-163879.
Figure 10:
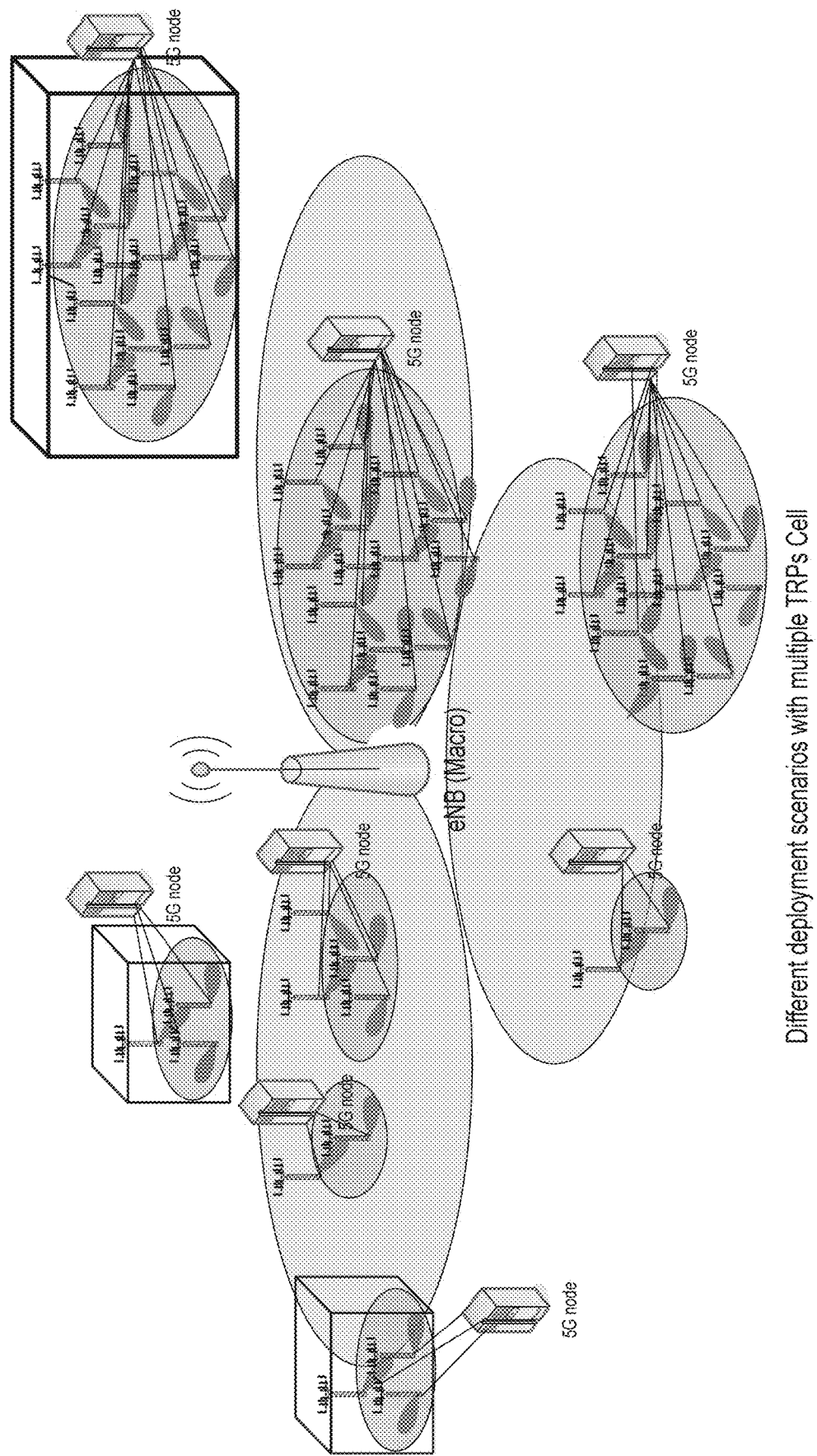
FIG. 10 illustrates different deployment scenarios with multiple TRP cells as shown in 3GPP R2-163879.
Figure 11:
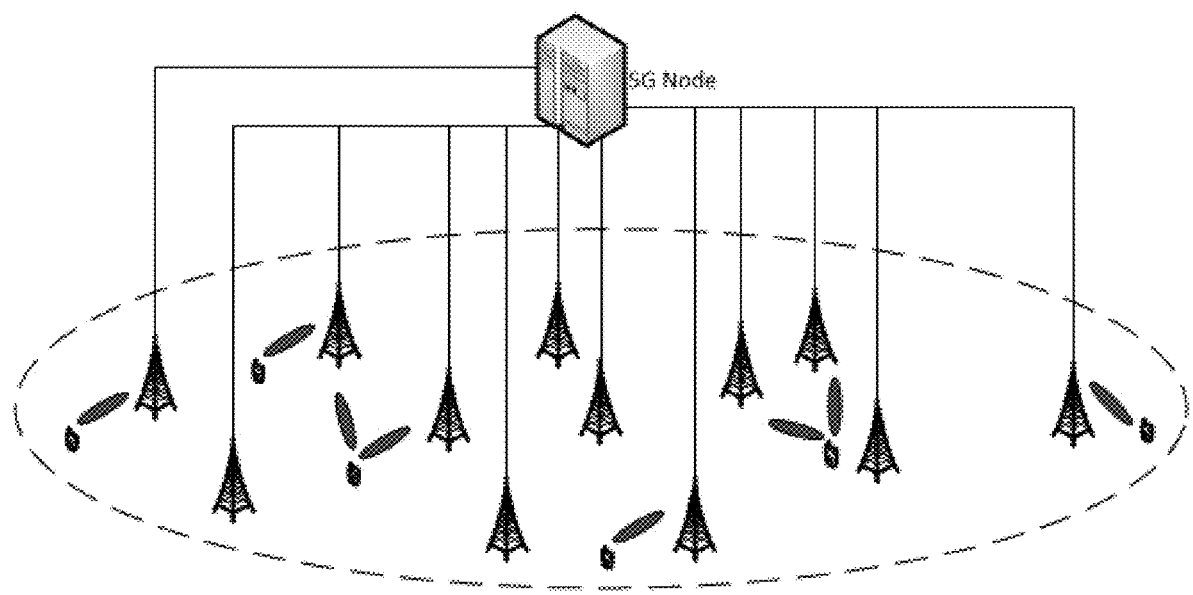
FIG. 11 illustrates one exemplary 5G cell as shown in 3GPP R2-162210.
Figures 12, 13:
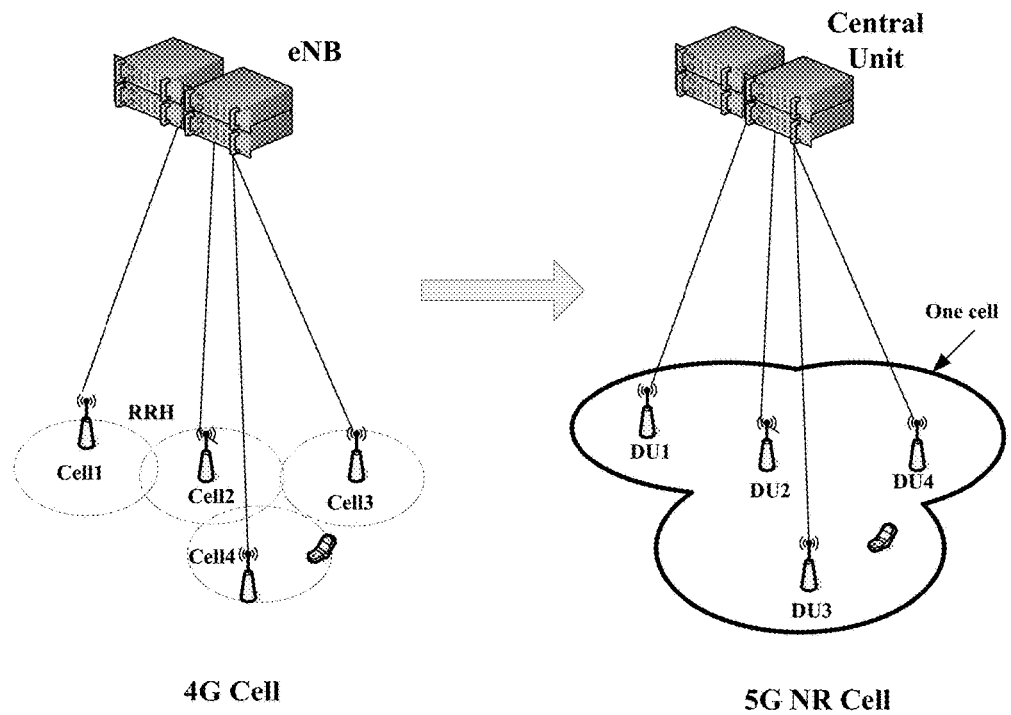
FIG. 12 illustrates one exemplary LTE cell and NR cell as shown in 3GPP R2-163471.
FIG. 13 is a reproduction of Table 5.2-1 from KT 5G-SIG TS 5G.213 v1.9 illustrating BRRS resource allocation field for xPDCCH with DL or UL DCI.

FIGS. 9-12 show some example of the concept of a cell in 5G NR. FIG. 9 shows a deployment with single TRP cell. FIG. 10 shows a deployment with multiple TRP cell. FIG. 11 shows one 5G cell comprising a 5G node with multiple TRPs. FIG. 12 shows a comparison between a LTE cell and a NR cell.

KT has organized KT PyeongChang 5G Special Interest Group (KT 5G-SIG) to realize the world's first 5G trial service at PyeongChang 2018 Olympic Winter Games. KT had developed a version of 5G common physical layer specification and the higher layer (L2/L3) specification for pushing forward the development of the 5G trial network. Three kinds of beamforming procedures are designed for beamforming-based operation in physical layer as disclosed in KT 5G-SIG TS 5G.213 v1.9.

Beamforming procedures in the KT 5G PHY specification are described in KT 5G-SIG TS 5G.213 v1.9 as follows:

5 Beamforming Procedures 5.1 Beam Acquisition and Tracking

The downlink transmitting beams are acquired from beam reference signals. Up to 8 antenna ports are supported for beam reference signal (BRS). A UE tracks downlink transmitting beams through the periodic BRS measurements. The BRS transmission period is configured by a 2 bit indicator in xPBCH. The BRS transmission period is the necessary time to sweep the whole downlink beams transmitted via BRS.

The following BRS transmission periods are supported:
"00" Single slot (<5 ms): supportable for maximum 7 downlink transmitting beams per antenna port
"01" Single subframe (=5 m): supportable for maximum 14 downlink transmitting beams per antenna port
"10" Two subframe (=10 ms): supportable for maximum 28 downlink transmitting beams per antenna port
"11" Four subframe (=20 ms): supportable for maximum 56 downlink transmitting beams per antenna port UE maintains a candidate beam set of 4 BRS beams, where for each beam the UE records beam state information (BSI). BSI comprises beam index (BI) and beam reference signal received power (BRSRP).

UE reports BSI on PUCCH or PUSCH as indicated by 5G Node per clause 8.3. SGNode may send BSI request in DL DCI, UL DCI, and RAR grant.

When reporting BSI on xPUCCH, UE reports BSI for a beam with the highest BRSRP in the candidate beam set.

When reporting BSI on xPUSCH, UE reports BSIs for $N \in \{1,2,4\}$ beams in the candidate beam set, where N is provided in the 2-bit BSI request from 5G Node. The BSI reports are sorted in decreasing order of BRSRP.

5.1.1 BRS management

There are two beam switch procedures, which are MAC-CE based beam switch procedure and DCI based beam switch procedure associated with BRS.

For the MAC-CE based beam switch procedure [4], 5G Node transmits a MAC-CE containing a BI to the UE.

The UE shall, upon receiving the MAC-CE, switch the serving beam at the UE to match the beam indicated by the MAC-CE. The beam swiching shall apply from the beginning of subframe n+kbeamswitch-delay-mac where subframe n is used for HARQ-ACK transmission associated with the MAC-CE and kbeamswitch-delay-mac=14. The UE shall assume that the 5G Node beam associated with xPDCCH, xPDSCH, CSI-RS, xPUCCH, xPUSCH, and xSRS is switched to the beam indicated by the MAC-CE from the beginning of subframe n+kbeam-switch-delay-mac.

For the DCI based beam switch procedure, 5G Node requests a BSI report via DCI and the beam_switch_indication field is set to 1 in the same DCI. The UE shall, upon receiving such a DCI, switch the serving beam at the UE to match the beam indicated by the first BI reported by the UE in the BSI report corresponding to this BSI request. The beam swiching shall apply from the beginning of subframe n+kbeam-switch-delay-dic where subframe n is used for sending the BSI report and kbeam-switch-delay-dci=11.

If beam_switch_indication field=0 in the DCI the UE is not required to switch the serving beam at the UE.

For any given subframe, if there is a conflict in selecting the serving beam at the UE, the serving beam is chosen that is associated with the most recently received subframe containing the MAC-CE (for MAC-CE based procedure) or the DCI (for DCI based procedure). A UE is not expected to receive multiple requests for beam switching in the same subframe.

5.2 Beam Refinement

BRRS is triggered by DCI. A UE can also request BRRS using SR [4]. To request the serving 5G Node to transmit BRRS, the UE transmits the scheduling request preamble where the higher layer configured preamble resource {u,v,f', and NSR} is dedicated for beam refinement reference signal initiation request.

The time and frequency resources that can be used by the UE to report Beam Refinement Information (BRI), which consists of BRRS Resource Index (BRRS-RI) and BRRS reference power (BRRS-RP), are controlled by the 5G Node. A UE can be configured with 4 Beam Refinement (BR) processes by higher layers. A 2-bit resource allocation field and a 2 bit process indication field in the DCI are described in Table 5.2-1 and Table 5.2-2, respectively.

FIG. 13 (reproduction of Table 5.2-1 from KT 5G-SIG TS 5G.213 v1.9).

FIG. 14 (reproduction of Table 5.2-2 from KT 5G-SIG TS 5G.213 v1.9).

A BR process comprises of up to eight BRRS resources, a resource allocation type and a VCID, and is configured via RRC signalling. A BRRS resource comprises of a set of antenna ports to be measured.

FIG. 15 (reproduction of Table 5.2-3 from KT 5G-SIG TS 5G.213 v1.9).

A BRRS transmission can span 1, 2, 5 or 10 OFDM symbols, and is associated with a BRRS resource allocation, BRRS process indication, and a BR process configuration as in Table 5.2-1, 5.2.-2 and 5.2.-3. A BRI reported by the UE corresponds to one BR process that is associated with up to eight BRRS resources. The UE shall assume that BRRS mapped to the BRRS resource ID 0 in each BRRS process is transmitted by the serving beam.

5.2.1 BRRS Management

There are two beam switch procedures, which are MAC-CE based beam switch procedure and DCI based beam switch procedure associated with BRRS.

For the MAC-CE based beam switch procedure [4], 5G Node transmits a MAC-CE containing a BRRS resource ID and the associated BR process ID to the UE.

The UE shall, upon receiving the MAC-CE, switch the serving beam at the UE to match the beam indicated by the MAC-CE. The beam swiching shall apply from the beginning of subframe n+kbeamswitch-delay-mac where subframe n is used for HARQ-ACK transmission associated with the MAC-CE and kbeamswitch-delay-mac=14. The UE shall assume that the 5G Node beam associated with xPDCCH, xPDSCH, CSI-RS, xPUCCH, xPUSCH, and xSRS is switched to the beam indicated by the MAC-CE from the beginning of subframe n+kbeam-switch-delay-mac.

For the DCI based beam switch procedure, 5G Node requests a BRI report via DCI and the beam_switch_indication field is set to 1 in the same DCI. The UE shall, upon receiving such a DCI, switch the serving beam at the UE to match the beam indicated by the first BRRS-RI reported by the UE in the BRI report corresponding to this BRI request. The beam swiching shall apply from the beginning of subframe n+kbeam-switch-delay-dic where subframe n is used for sending the BRI report and kbeam-switch-delay-dci=11.

If beam_switch_indication field=0 in the DCI the UE is not required to switch the serving beam at the UE.

For any given subframe, if there is a conflict in selecting the serving beam at the UE, the serving beam is chosen that is associated with the most recently received subframe containing the MAC-CE (for MAC-CE based procedure) or the DCI (for DCI based procedure). A UE is not expected to receive multiple requests for beam switching in the same subframe.

5.3 Beam Recovery

If a UE detects the current serving beam is misaligned [4] and has BSIs for beam recovery, the UE shall perform beam recovery process.

In the UL synchronized UE case, the UE transmits scheduling request by scheduling request preamble where the preamble resource {u, v, f' and $N_{SR}$} is dedicated for beam recovery as configured by higher layers. Upon the reception of this request, 5G Node may initiate BSI reporting procedure as described in section 8.3.

In UL asynchronized UE case, the UE transmits random access preamble for contention based random access. If the UE is scheduled by RAR triggering BSI reporting, the UE reports N BSIs in Msg3 as UCI multiplexing in [3].

< ... >

8.3 UE Procedure for Reporting Beam State Information (BSI)

UE reports BSI on xPUCCH or xPUSCH as indicated by 5G Node. 5G Node can send BSI request in DL DCI, UL DCI, and RAR grant.

If a UE receives BSI request in DL DCI, the UE reports a BSI on xPUCCH. The time/frequency resource for xPUCCH is indicated in the DL DCI. When reporting BSI on xPUCCH, UE reports a BSI for a beam with the highest BRSRP in the candidate beam set. If UE receives BSI request in UL DCI or in RAR grant, UE reports BSIs on xPUSCH. The time/frequency resource for xPUSCH is indicated in the UL DCI or RAR grant that requests BSI report. When reporting BSI on xPUSCH, UE reports BSI for $N \in \{1,2,4\}$ beams with the highest BRSRP in the candidate beam set, where N is provided in the DCI.

If BSI reporting is indicated on both xPUCCH and xPUSCH in the same subframe, UE reports BSI on xPUSCH only and discards the xPUCCH trigger.

8.3.1 BSI Reporting Using xPUSCH

Upon decoding in subframe n an UL DCI with a BSI request, UE shall report BSI using xPUSCH in subframe n+4+m+l, where parameters m=0 and l={0, 1, . . . 7} is indicated by the UL DCI.

The number of BSIs to report, $N \in \{1,2,4\}$, is indicated in UL DCI.

A UE shall report N BSIs corresponding to N beams in the candidate beam set.

A BSI report contains N BIs and corresponding BRSRPs. A UE shall report wideband BRSRPs.

A UE is not expected to receive more than one request for BSI reporting on xPUSCH for a given subframe.

8.3.2 BSI Reporting Using xPUCCH

Upon decoding in subframe n a DL DCI with a BSI request, UE shall report BSI using xPUCCH subframe index n+4+m+k, where parameters m=0 and k={0, 1, . . . 7} is indicated by the DL DCI.

When reporting BSI on xPUCCH, UE reports BSI for a beam with the highest BRSRP in the candidate beam set.

A BSI report contains BI and corresponding BRSRP. A UE shall report wideband BRSRP.

A UE is not expected to receive more than one request for BSI reporting on xPUCCH for a given subframe.

8.3.3 BSI Definition 8.3.3.1 BRSRP Definition

The BRSRP indices and their interpretations are given in Table 8.3.3.1-1. The reporting range of BRSRP is defined from −140 dBm to −44 dBm with 1 dB resolution as shown in Table 8.3.3.1-1.

The UE shall derive BRSRP values from the beam measurements based on BRS defined in 5G.211. The UE shall derive BRSRP index from the measured BRSRP value. Each BRSRP index is mapped to its corresponding binary representation using 7 bits.

FIG. 16 (reproduction of Table 8.3.3.1-1 from KT 5G-SIG TS 5G.213 v1.9).

8.3.3.2 Beam Index Definition

BI indicates a selected beam index. The BI is the logical beam index associated with antenna port, OFDM symbol index and BRS transmission period [2], which is indicated by 9 bits.

8.4 UE procedure for reporting Beam Refinement Information (BRI)

8.4.1 BRI reporting using xPUSCH

If the uplink DCI in subframe n indicates a BRRS transmission, the BRRS is allocated in subframe n+m where m={0,1,2,3} is indicated by a 2 bit RS allocation timing in the DCI.

A BRI report is associated with one BR process that is indicated in the uplink DCI for the UE.

Upon decoding in subframe n an UL DCI with a BRI request, the UE shall report BRI using xPUSCH in subframe n+4+m+l, where parameters m={0, 1, 2, 3} and l={0, 1, . . . 7} are indicated by the UL DCI.

A UE shall report wideband BRRS-RP values and BRRS-RI values corresponding to the best NBRRS BRRS resource ID where NBRRS is configured by higher layers If the number of configured BRRS resource ID associated with the BR process is less than or equal to NBRRS then the UE shall report BRRS-RP and BRRS-RI corresponding to all the configured BRRS resources.

A UE is not expected to receive more than one BRI report request for a given subframe.

8.4.2 BRI Reporting Using xPUCCH

If the DL DCI in subframe n indicates a BRRS transmission, the BRRS is allocated in subframe n+m where m={0,1,2,3} is indicated by the DL DCI.

A BRI report is associated with one BRRS process that is indicated in the downlink DCI for the UE. Upon decoding in subframe n a DL DCI with a BRI request, the UE shall report BRI using xPUCCH in subframe n+4+m+k, where parameters m={0, 1, 2, 3} and k={0, 1, . . . 7} are indicated by the DL DCI.

A UE shall report a wideband BRRS-RP value and a BRRS-RI value corresponding to the best BRRS resource ID.

A UE is not expected to receive more than one BRI report request for a given subframe.

8.4.3.1 BRRS-RP definition

The reporting range of BRRS-RP is defined from −140 dBm to −44 dBm with 1 dB resolution.

The mapping of BRRS-RP to 7 bits is defined in Table 8.4.3.1-1. Each BRRS-RP index is mapped to its corresponding binary representation using 7 bits.

FIG. 17 (reproduction of Table 8.4.3.1-1 from KT 5G-SIG TS 5G.213 v1.9).

8.4.3.2 BRRS-RI Definition

BRRS-RI indicates a selected BRRS resource ID. A BR process may comprise of a maximum of 8 BRRS resource IDs. The selected BRRS resource ID is indicated by 3 bits as in Table 8.4.3.2-1.

Figures 18, 19:
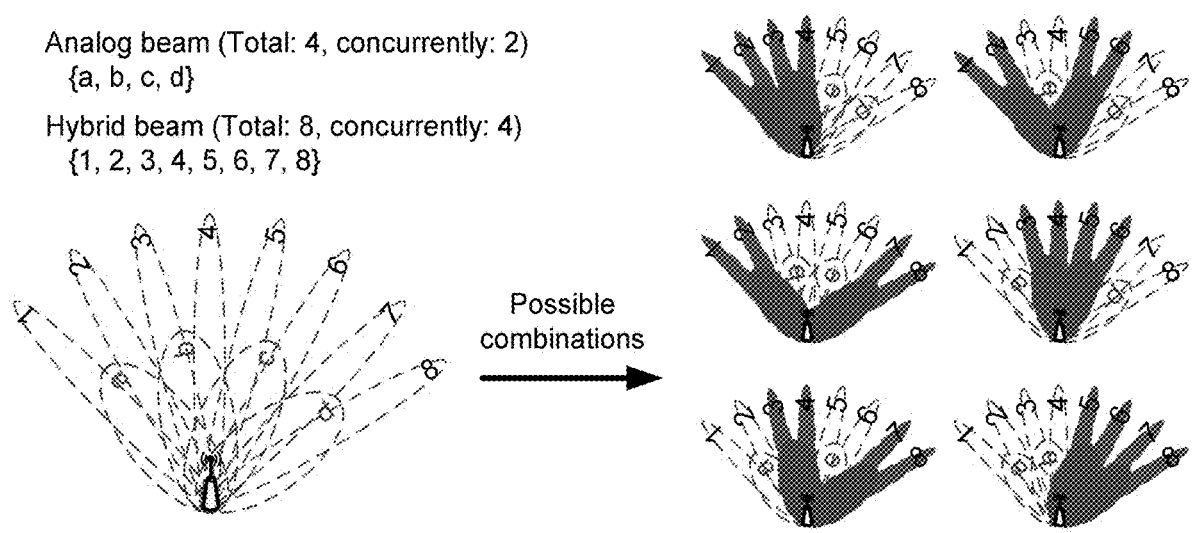
FIG. 18 is a reproduction of Table 8.4.3.2-1 from KT 5G-SIG TS 5G.213 v1.9 illustrating BRRS-RI mapping.
FIG. 19 illustrates one example for a combination limitation of beam generation.

FIG. 18 (reproduction of Table 8.4.3.2-1 from KT 5G-SIG TS 5G.213 v1.9).

Beamforming management in L2 layer is described in KT 5G-SIG TS 5G.321 v1.2 as follows:

5.5 Beam Management

5.5.1 Beam Feedback Procedure

The beam feedback procedure is used to report beam measurement results to the serving cell. There are two beam feedback procedures defined one based on measurement of beam reference signal (BRS), beam state information reporting below, and one based on measurement of beam refinement reference signal (BRRS), beam refinement information reporting below.

5.5.1.1 Beam State Information Reporting

The BRS-based beam state information (BSI) reports initiated by xPDCCH order are transmitted through UCI on xPUCCH/xPUSCH as scheduled by the corresponding DCI [1]; event triggered BSI reports are transmitted through BSI Feedback MAC Control Element defined in subclause 6.1.3.11 using normal SR or contention-based RACH procedure, where BSI consists of Beam Index (BI) and beam reference signal received power (BRSRP). BSI reports are based on BRS transmitted by the serving cell.

5.5.1.1.1 BSI Reporting Initiated by xPDCCH Order

The BSI reports initiated by xPDCCH order are based on the latest measurement results obtained from the 5G physical layer.

if an xPDCCH order which requests BSI reporting through UCI via xPUCCH by serving cell is received in this TTI:
  if the serving beam is not the best beam and the BRSRP of the best beam is higher than BRSRP of the serving beam:
    instruct the 5G physical layer to signal the best beam on the scheduled UCI resource via xPUCCH as defined in [1];
  else:
    instruct the 5G physical layer to signal the serving beam on the scheduled UCI resource via xPUCCH as defined in [1];
if an xPDCCH order which requests BSI reporting through UCI via xPUSCH by serving cell is received in this TTI:
  if the number of BSI for reports requested equals to 1:
    if the serving beam is not the best beam and the BRSRP of the best beam is higher than BRSRP of the serving beam:
      instruct the 5G physical layer to signal the best beam on the scheduled UCI resource via xPUSCH as defined in [1];
    else:
      instruct the 5G physical layer to signal the serving beam on the scheduled UCI resource via xPUSCH as defined in [1];
  else if the number of BSI reports requested is higher than 1 and:
    if the serving beam is not the best beam and the BRSRP of the best beam is higher than BRSRP of the serving beam:
      instruct the 5G physical layer to signal N BSIs report with the best beam as the first BSI and the next N−1 highest BRSRP beam values on the scheduled UCI resource via xPUSCH;
    else:
      instruct the 5G physical layer to signal N BSIs report with the serving beam as the first BSI and the next N−1 highest BRSRP beam values on the scheduled UCI resource via xPUSCH;

5.5.1.1.2 BSI Reporting Initiated by 5G-MAC

The BSI reports initiated by 5G-MAC are based on an event trigger.

if the BRSRP of the best beam is higher than beamTriggeringRSRPoffset dB+the BRSRP of the serving beam and:
  if the UE is uplink synchronized (i.e., timeAlignmentTimer is not expired)
    UE transmits BSI Feedback MAC Control Element on the UL resource granted through normal SR procedure;

else:
  UE transmits BSI Feedback MAC Control Element on the UL resource for Msg3 granted through contention-based random access procedure;

The following terminology may be used hereafter in the detailed description:

BS: a network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: a transmission and reception point provides network coverage and directly communicates with UEs. TRP could also be referred to as distributed unit (DU) or network node.

Cell: a cell is composed of one or multiple associated TRPs, i.e. coverage of the cell is composed of coverage of all associated TRP(s). One cell is controlled by one BS. A cell could also be referred to as a TRP group (TRPG).

Beam sweeping: in order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.

Beam sweeping number: necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.

Serving beam: serving beam for a UE is a beam generated by a network node, e.g. TRP, which is currently used to communicate with the UE, e.g. for transmission and/or reception.

Candidate beam: candidate beam for a UE is a candidate of a serving beam. Serving beam may or may not be candidate beam.

Qualified beam: qualified beam is a beam with radio quality, based on measuring signal on the beam, better than a threshold.

The best serving beam: The serving beam with the best quality (e.g. the highest Beam Reference Signal Received Power (BRSRP) value).

The worst serving beam: The serving beam with the worst quality (e.g. the worst BRSRP value).

The following assumptions for network side may be used hereafter in the detailed description:

NR using beamforming could be standalone, i.e. UE can directly camp on or connect to NR.
  NR using beamforming and NR not using beamforming could coexist, e.g. in different cells.
TRP would apply beamforming to both data and control signaling transmissions and receptions, if possible and beneficial.
  Number of beams generated concurrently by TRP depends on TRP capability, e.g. maximum number of beams generated concurrently by different TRPs may be different.
  Beam sweeping is necessary, e.g. for the control signaling to be provided in every direction.
  (For hybrid beamforming) TRP may not support all beam combinations, e.g. some beams could not be generated concurrently. FIG. 19 shows an example for combination limitation of beam generation.
Downlink timing of TRPs in the same cell are synchronized.
RRC layer of network side is in a Base Station (BS).
TRP should support both UEs with UE beamforming and UEs without UE beamforming, e.g. due to different UE capabilities or UE releases.

The following assumptions for UE side may be used hereafter in the detailed description:

UE may perform beamforming for reception and/or transmission, if possible and beneficial.
  Number of beams generated concurrently by UE depends on UE capability, e.g. generating more than one beam is possible.
  Beam(s) generated by UE is wider than beam(s) generated by TRP, gNB, or eNB.
  Beam sweeping for transmission and/or reception is generally not necessary for user data but may be necessary for other signaling, e.g. to perform measurement.
  (For hybrid beamforming) UE may not support all beam combinations, e.g. some beams could not be generated concurrently. FIG. 19 shows an example for combination limitation of beam generation.
Not every UE supports UE beamforming, e.g. due to UE capability or UE beamforming is not supported in NR first (few) release(s).
One UE is possible to generate multiple UE beams concurrently and to be served by multiple serving beams from one or multiple TRPs of the same cell.
  Same or different (downlink (DL) or uplink (UL)) data could be transmitted on the same radio resource via different beams for diversity or throughput gain.
There are at least two UE (RRC) states: connected state (or called active state) and non-connected state (or called inactive state or idle state). Inactive state may be an additional state or belong to connected state or non-connected state.

Figure 20:
FIG. 20 illustrates gain compensation by beamforming in HF-NR system as shown in 3GPP R2-162251.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 20 (quoted from 3GPP R2-162251) illustrates gain compensation by beamforming.

Figure 21:
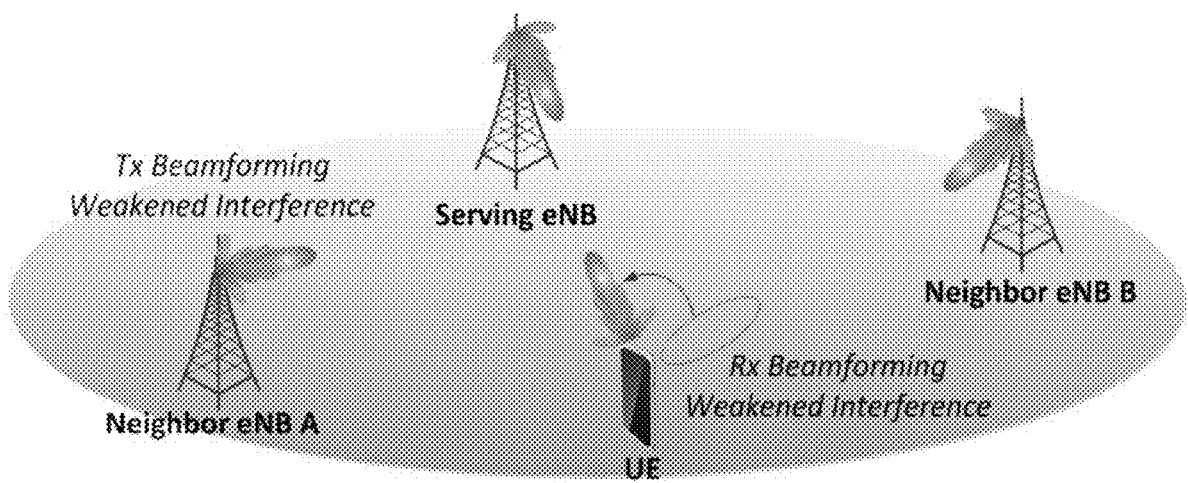
FIG. 21 illustrates weakened interference by beamforming in HF-NR system as shown in 3GPP R2-162251.

From a SINR perspective, sharp beamforming reduces interference power from neighbor interferers, i.e. neighbor eNBs in a downlink case or other UEs connected to neighbor eNBs. In a Transmission (TX) beamforming case, only interference from other TXs whose current beam points the same direction to the Reception (RX) will be the "effective" interference. The "effective" interference means that the interference power is higher than the effective noise power. In a RX beamforming case, only interference from other TXs whose beam direction is the same to the UE's current RX beam direction will be the effective interference. FIG. 21 (quoted from 3GPP R2-162251) illustrates weakened interference by beamforming.

As disclosed above, physical layer procedures for beamforming require multi-beam based approaches. According to one approach, the eNB performs beamforming to overcome the higher pathloss in higher frequencies. At one time or at one symbol time, the eNB generates some of eNB beams instead of all eNB beams due to the limits of analog or hybrid beamforming. For transmission scheduling, the eNB requires the beam information of a UE, for instance, which eNB beam is qualified for the UE.

According to KT 5G-SIG TS 5G.213 v1.9, KT physical layer specification specifies three beamforming procedures:

Beam acquisition and tracking, Beam refinement, and Beam Recovery. The beamforming procedures are utilized for finding a network serving beam for a UE. The UE shall assume that the downlink transmissions (e.g., x Physical Downlink Control Channel (xPDCCH), x Physical Downlink Shared Channel (xPDSCH), Channel State Information Reference Signal (CSI-RS)) and uplink transmissions (e.g. x Physical Uplink Control Channel (xPUCCH), x Physical Uplink Shared Channel (xPUSCH), x Sound Reference Signal (xSRS) are served via the network serving beam. More specifically, KT physical layer specification considers only one network serving beam for a UE as discussed in KT 5G-SIG TS 5G.213 v1.9.

As specified in KT 5G-SIG TS 5G.213 v1.9, the downlink transmitting beams are acquired from beam reference signals (BRS). Up to 8 antenna ports per one symbol are supported for the BRS. A UE tracks downlink transmitting beams through periodic BRS measurements. The BRS transmission period is configured by a 2 bit indicator in x Physical Broadcast Channel (xPBCH). The BRS transmission period is the necessary time to sweep the whole downlink network beams transmitted via BRS. There is one BRS occasion, which comprises multiple symbols, every BRS transmission period. According to the specification in [8], the BRS transmission is cell-specific. Fixed downlink transmitting beams are swept every BRS transmission period for beam acquisition and tracking.

Beam refinement reference signal (BRRS) are utilized for beam refinement. BRRS transmission are transmitted on up to eight antenna ports per one symbol and BRRS can span 1, 2, 5 or 10 OFDM symbols within one subframe. BRRS is triggered by downlink control information (DCI) delivered on xPDCCH, and a UE can also request BRRS using scheduling request preamble. After receiving the DCI triggering BRRS with BRRS resource allocation and BRRS process indication, the UE will receive/measure BRRS and report Beam Refinement Information (BRI), which consists of BRRS Resource Index (BRRS-RI) and BRRS received power (BRRS-RP), to network. The UE shall assume that BRRS mapped to the BRRS resource ID 0 in each BRRS process is transmitted via the network serving beam.

It may be possible that a UE can have the capability to perform UE beamforming to get more power gain. When UE beamforming is applied, the network beam and UE beam should be matched for successful transmission and reception. The UE should know to utilize which UE beam(s) for downlink reception and uplink transmission. The UE beam set, which comprises the UE beam(s) that are matched to qualified network beam(s), may be obtained via measuring downlink reference signaling for network beamforming, e.g. BRS or BRRS. However, if the UE is used with an analog beamformer or hybrid beamformer, the UE cannot measure or detect the downlink reference signal via all possible UE beams at the same time. As a result, it takes much more time for the UE to finish the downlink reference signaling measurement in order to match the UE beam and the network beam. For instance, it may take four BRS transmission periods to finish UE beam sweeping with four UE beams. Methods to reduce the latency for UE beam sweeping should be contemplated.

One potential solution is to shorten the periodicity of the BRS. In this solution, the beam reference signal transmission period is shortened from $P_{BRS}$ to $P_{BRS}/M$, in which M may be the maximum value of the potential UE beam sweeping number. M may be informed in the system information or may be otherwise specified. If a UE performs UE beamforming, the UE may perform m times of UE beam switching to complete network and UE beam sweeping, wherein $1 \leq m \leq M$. The latency can be kept shorter than or equal to $M \cdot P_{BRS}/M = P_{BRS}$. If the UE performs UE beam sweeping with m UE beams, the UE can measure each beam reference signal occasions and requires $m \cdot P_{BRS}/M = P_{BRS} \cdot m/M$ to finish beam reference signal measurement with UE beam sweeping. In one embodiment, if the UE performs UE beam sweeping with m UE beams, the UE may measure/detect at least m beam reference signal occasions every M beam reference signal transmission periods. For instance, the UE can skip the measurement/detection of at most (M−m) beam reference signal occasions. If the UE is omni-directional without UE beamforming, the UE can measure/detect one beam reference signal occasion every M beam reference signal transmission period. The UE may also skip measurement/detection of at most (M−1) beam reference signal occasions. The UE, without UE beam sweeping, can finish beam reference signal measurement with a latency $P_{BRS}$.

Another potential solution is using repetition patterns for beam sweeping. In this solution, the network node transmits a downlink reference signal for beam management within one occasion, and the network node performs network beam sweeping for the downlink reference signal repeatedly and multiple times according to a repetition pattern within the occasion. The repetition pattern is derived/determined via a factor or a number of repetition times. More specifically, the repetition pattern distributes the symbols in the occasion into multiple symbol sets. The UE can perform UE beam sweeping according to the repetition pattern for measuring/detecting the downlink reference signal. The UE can switch UE beams for measuring/detecting the downlink reference signal according to the repetition pattern within the occasion.

Another potential solution is using repetitions patterns for beam sweeping using the BRS. For a BRS, the network beam sweeping repeats M times every BRS transmission period. The BRS is cell-specific, network node-specific, or TRP-specific. Fixed downlink transmitting beams are swept every BRS transmission period for beam acquisition and tracking. The M value may be the maximum value of possible UE beam sweeping number. The M value may be informed in system information or specified. As an instance shown in FIG. 12, the maximum number of beam training opportunities in one beam reference signal occasion every beam reference signal transmission period is $P \cdot N_{symb\_total}^{DL}$, wherein P is the number of antenna ports per one symbol, $N_{symb\_total}^{DL}$ is the number of symbols supportable for beam reference signal transmission in one beam reference signal occasion. Assuming P=8 and symbol number of one slot $N_{symb}^{DL}=7$, the maximum number of beam training opportunities every beam reference signal transmission period is 56/112/224/448 respectively for one slot/one subframe/two subframes/four subframes supportable for beam reference signal transmission. The one beam reference signal occasion may be one slot/one subframe/two subframes/four subframes (assuming one subframe comprises two slots).

For assisting UE beam sweeping, a repetition pattern with a factor M distributes $N_{symb\_total}^{DL}$ symbols into at least M symbol sets. The network can perform network beam sweeping at least one time within each symbol set. Thus, the network beam sweeping can repeat M times. In one embodiment, each of the M symbol sets may not have the same number of symbols. In another embodiment, each of the M symbol sets has the same number of symbols. The $N_{symb\_total}^{DL}$ symbols are equally distributed to at least the M symbol sets. More specifically, each of the M symbol sets has at least $\lfloor N_{symb\_total}^{DL}/M \rfloor$ symbols. For different symbol sets of BRS transmissions, the UE can utilize different UE beams to measure/detect the beam reference signals. More specifically, the UE utilizes at least one UE beam to measure and/or detect the beam reference signals of one symbol set. The UE can switch to another UE beam(s) to measure and/or detect the beam reference signals of another symbol set. The repetition pattern with factor M can support the UE beam sweeping of m UE beams, wherein 1≤m≤M.

When the UE reports a received power and/or quality of a beam reference signal, the UE may report the symbol index on which the beam reference signal is measured and/or detected. When UE reports multiple received power and/or quality of multiple beam reference signals, the UE may report the symbol indices where the UE measures and/or detects the multiple beam reference signals. If the UE performs UE beam sweeping with m UE beams, the UE can at least measure and/or detect m symbol sets of beam reference signals in one beam reference signal occasion. More specifically, the UE can skip the measurement and/or detection of at most (M−m) symbol sets of beam reference signals in one beam reference signal occasion. If the UE is omni-directional without UE beamforming, the UE can measure and/or detect at least one symbol set of beam reference signals in one beam reference signal occasion. Moreover, the UE may skip measurement and/or detection of at most (M−1) symbol sets of the beam reference signals in one beam reference signal occasion.

Figure 23:
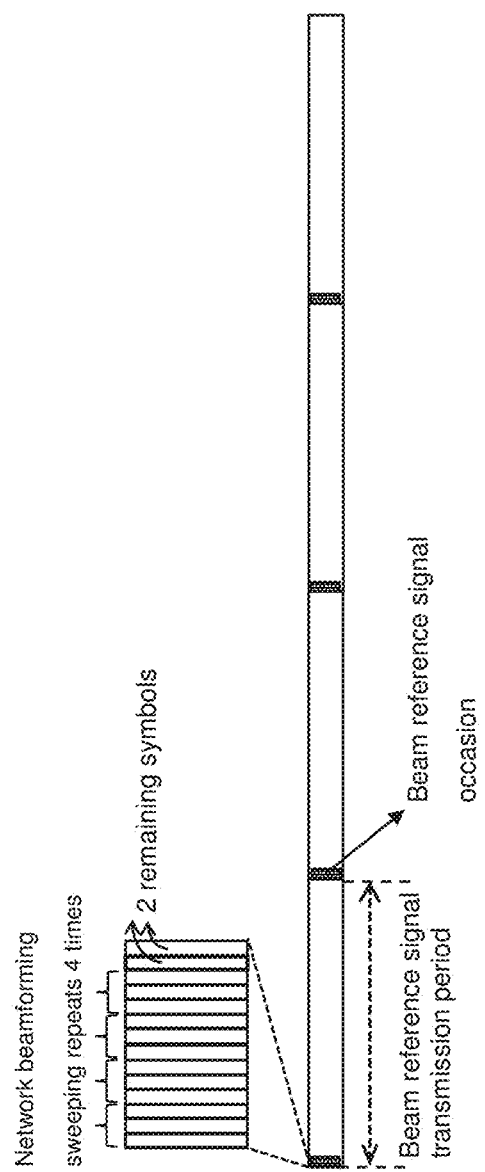
FIG. 23 illustrates one embodiment of repetition patterns for beam sweeping.

If $N_{symb\_total}^{DL}$ is not a multiple of M, there are some remaining symbols in one beam reference signal occasion every beam reference signal transmission period. For instance, there may be $N_{symb\_total}^{DL} - M \cdot \lfloor N_{symb\_total}^{DL}/M \rfloor$ remaining symbols. As shown in FIG. 23, one beam reference signal occasion for each beam reference signal transmission period has 14 symbols, wherein each symbol may include multiple antenna ports for multiple beam reference signals. The network may generate one network beam per one antenna port per one symbol. In FIG. 23, the 14 symbols are distributed into 4 symbol sets, wherein each symbol set includes three symbols for a beam reference signal transmission. The network can perform network beam sweeping within each symbol set. Thus, the network beam sweeping can repeat M times. More specifically, the network generates the same network beams for beam reference signals on the $1^{st}$, $4^{th}$, $7^{th}$, and $10^{th}$ symbols. The network generates the same network beams for beam reference signals on the $2^{nd}$, $5^{th}$, $8^{th}$, and $11^{th}$ symbols. The network generates the same network beams for beam reference signals on the $3^{rd}$, $6^{th}$, $9^{th}$, and $12^{th}$ symbols. For different symbol sets of beam reference signal transmission, the UE can utilize different UE beams to measure/detect beam reference signals.

Figure 24:
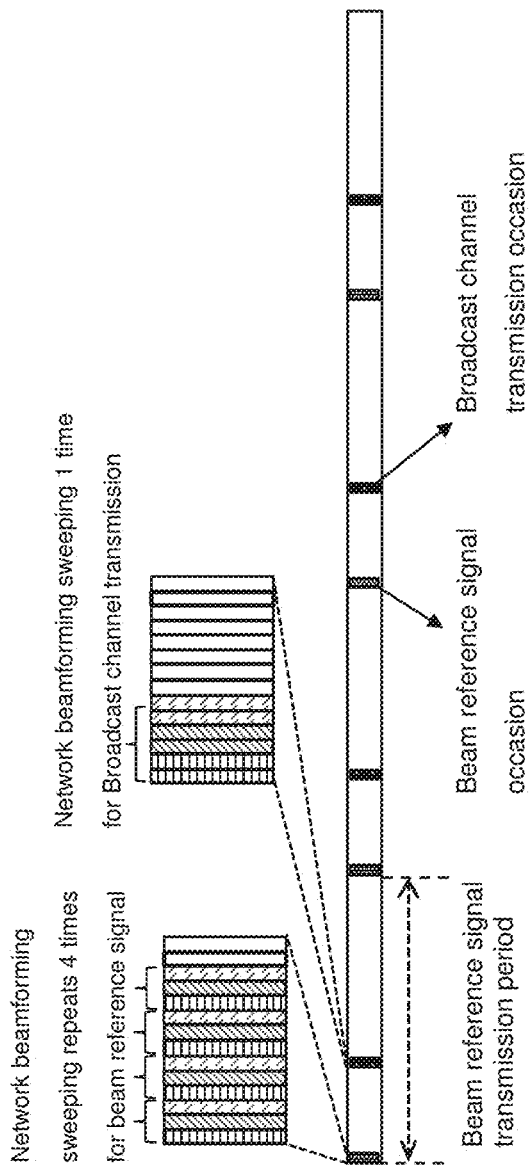
FIG. 24 illustrates one embodiment of repetition patterns for beam sweeping.

Moreover, there are 2 remaining symbols. These remaining symbol(s) may be utilized for other downlink transmission, e.g., CSI-RS. Alternatively, the remaining symbol(s) may be utilized for other uplink transmission, e.g. SRS. Alternatively, the remaining symbol(s) may be utilized for beam reference signal transmission with a longer time (longer than one beam reference signal transmission period) to sweep the whole network beams of beam reference signals. The beam reference signal transmission on the remaining symbol(s) may be utilized for Radio Resource Management (RRM) measurement. The beam reference signal transmission on the remaining symbol(s) may be utilized for measurement of other TRP(s)/network node(s). As shown in FIG. 24, the 1, 2, and 3 means different network beam sets or different sets of antenna ports for a beam reference signal. The last two remaining symbols of each beam reference signal occasion are utilized for the beam reference signal transmission, and the network cannot finish network beam sweeping one time with one beam reference signal occasion. The beam reference signal transmission on the remaining symbol(s) sweeps 2 times every three beam reference signal transmission periods. If one kind of measurement may require a measurement period longer than beam reference signal transmission period, the beam reference signal transmission on the remaining symbol(s) may be utilized for this kind of measurement.

Figure 25:
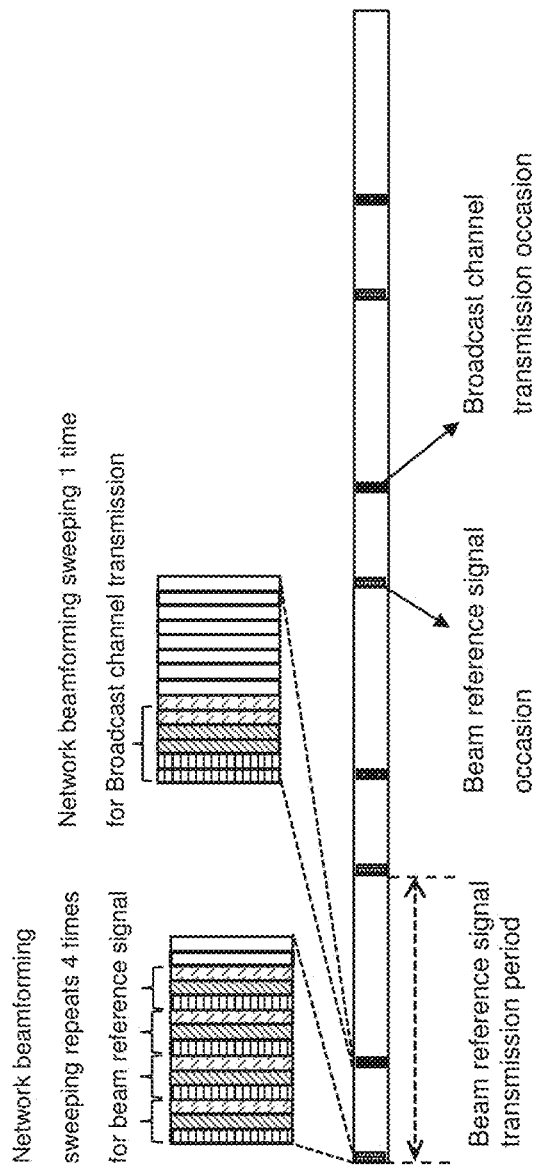
FIG. 25 illustrates one embodiment of repetition patterns for beam sweeping.

Moreover, if synchronization signals are Frequency Division Multiplexed (FDMed) with a beam reference signal, the network can perform network beam sweeping for synchronization signals at each symbol set. Thus, network beam sweeping for synchronization signals can repeat M times every beam reference signal transmission period. More specifically, the network beam for beam reference signal may not be the same as the network beam for synchronization signal at the same symbol. The antenna port(s) for the beam reference signal may not be the same as the antenna port(s) for the synchronization signal at the same symbol. As shown in FIG. 25, the network can generate the same network beams for the synchronization signals on the $1^{st}$, $4^{th}$, $7^{th}$, and $10^{th}$ symbols. The network can generate the same network beams for synchronization signals on the $2^{nd}$, $5^{th}$, $8^{th}$, and $11^{th}$ symbols. The network can generate the same network beams for synchronization signals on the $3^{rd}$, $6^{th}$, $9^{th}$, and $12^{th}$ symbols. For one kind of synchronization signal, the sequences of the synchronization signal transmitted on different symbols may be the same if the synchronization signal transmissions on different symbols are transmitted on the same antenna port or from the same network beam. For another kind of synchronization signal, the sequences/cyclic shifts of the synchronization signal transmitted on different symbols may be different even if the synchronization signal transmissions on different symbols are transmitted on the same antenna port or from the same network beam.

Moreover, the distributed M symbol sets for beam reference signal may have the same association with the reception of a broadcast channel. This means the network beam sweeping for a beam reference signal/synchronization signal repeats M times, but the network beam sweeping for a broadcast channel does not repeat, i.e. sweeping one time. More specifically, for the distributed M symbol sets, the different M symbols with the same network beam(s) are associated with the same symbol(s) for the broadcast channel. Different UEs, which detect beam reference signals on different symbol sets, may receive the broadcast channel on the same symbol(s). As shown in FIG. 25, it is assumed that the transmission timing unit of the broadcast channel transmission is two symbols. The beam reference signal transmission on the $1^{st}$, $4^{th}$, $7^{th}$, and $10^{th}$ symbols are associated with the first two symbols for broadcast channel transmission. The beam reference signal transmission on the $2^{nd}$, $5^{th}$, $8^{th}$, and $11^{th}$ symbols are associated with the second two symbols for broadcast channel transmission. The beam reference signal transmission on the $3^{rd}$, $6^{th}$, $9^{th}$, and $12^{th}$ symbols are associated with the third two symbols for the broadcast channel transmission.

Figure 26:
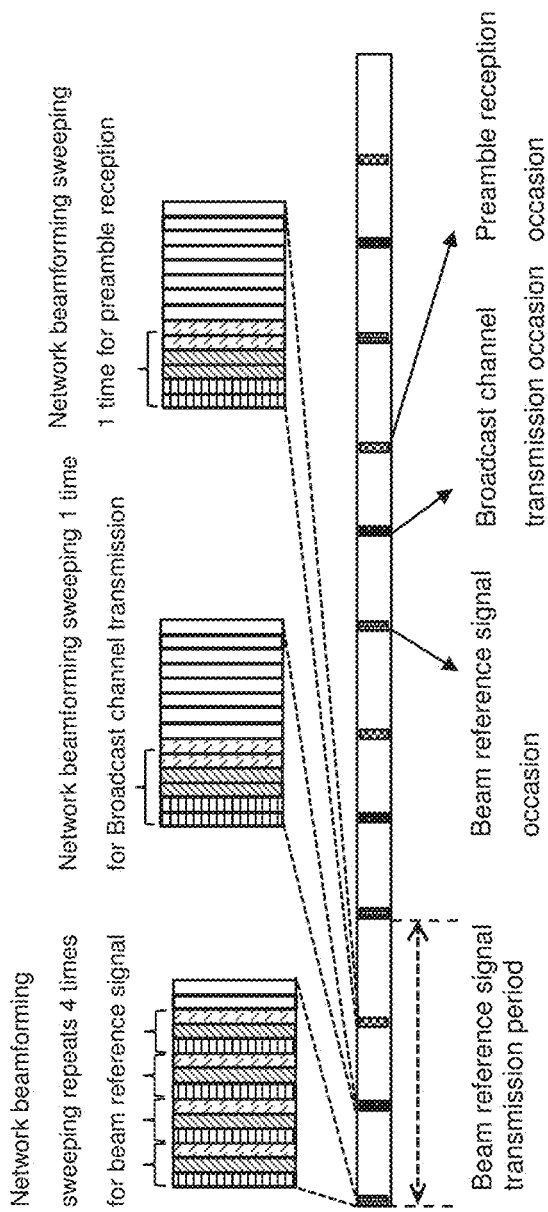
FIG. 26 illustrates one embodiment of repetition patterns for beam sweeping.

Moreover, the distributed M symbol sets for the beam reference signal may have the same association with the uplink transmission of the preamble. It means that the network beam sweeping for the beam reference signal/synchronization signal repeats M times, but the network beam sweeping for receiving the preamble does not repeat, i.e. sweeping one time. More specifically, for the distributed M symbol sets, the different M symbols with the same network beam(s) are associated with the same symbol(s) for the preamble. Different UEs, which detect beam reference signals on different symbol sets, may transmit the preamble on the same symbol(s). As shown in FIG. 26, it is assumed that the transmission timing unit of the preamble transmission is two symbols. The beam reference signal transmission on the $1^{st}$, $4^{th}$, $7^{th}$, and $10^{th}$ symbols are associated with the first two symbols for the preamble reception. The beam reference signal transmission on the $2^{nd}$, $5^{th}$, $8^{th}$, and $11^{th}$ symbols are associated with the second two symbols for the preamble reception. The beam reference signal transmission on the $3^{rd}$, $6^{th}$, $9^{th}$, and $12^{th}$ symbols are associated with the third two symbols for the preamble reception. The preamble may be used for random access. Alternately, the preamble may be for beam recovery. The preamble may be for a request of an aperiodic reference signal. More specifically, the preamble is a scheduling request preamble.

Another potential solution is using repetitions patterns for beam sweeping using beam refinement reference signal. If the network triggers a downlink beam refinement reference signal for the UE to measure and/or detect, the network may perform network beam sweeping N times within the triggered measurement occasion. The triggered measurement occasion may be composed of $N_{symb\_trigger}^{DL}$ symbols. More specifically, $N_{symb\_trigger}^{DL}$ may be indicated in the downlink signaling for the triggering downlink beam refinement reference signal for UE measurement/detection. $N_{symb\_trigger}^{DL}$ may be 5 or 10. A repetition pattern(s) with a factor N is to distribute $N_{symb\_trigger}^{DL}$ symbols into at least N symbol sets. The repetition pattern(s) can be configured or specified. The value N may be configured or indicated in the downlink signaling. The value N is smaller than or equal to M, wherein M may be the maximum value of possible UE beam sweeping numbers. M may be informed in the system information or may be specified. Alternatively, the UE may report the maximum value of N to the network as an UE capability or UE suggestion. In one embodiment, the $N_{symb\_trigger}^{DL}$ symbols are equally distributed to at least N symbol sets. Alternatively, the $N_{symb\_trigger}^{DL}$ symbols are not equally distributed to the N symbol sets. More specifically, each of the N symbol sets is composed of at least $\lfloor N_{symb\_trigger}^{DL}/N \rfloor$ symbols. If $N_{symb\_trigger}^{DL}$ is not multiple times of N, (N−1) symbol sets may be composed of the same number of symbols, and one symbol set is composed of the remaining symbols. In another embodiment, (N−1) symbol sets are composed of at least $\lfloor N_{symb\_trigger}^{DL}/N \rfloor$ symbols, and one symbol set is composed of $N_{symb\_trigger}^{DL}-(N-1)\cdot\lfloor N_{symb\_trigger}^{DL}/N \rfloor$ remaining symbols. In another embodiment, (N−1) symbol sets are composed of at least $\lfloor N_{symb\_trigger}^{DL}/(N-1) \rfloor$ symbols and one symbol set is composed of $N_{symb\_trigger}^{DL}-(N-1)\cdot\lfloor N_{symb\_trigger}^{DL}/(N-1) \rfloor$ remaining symbols.

For different symbol sets of downlink beam refinement reference signal, the UE can utilize different UE beams to measure/detect the downlink beam refinement reference signal transmission. More specifically, the UE utilizes at least one UE beam to measure/detect the downlink beam refinement reference signal transmissions of one symbol set. The UE can switch to another UE beam to measure/detect the downlink beam refinement reference signal transmissions of another symbol set. The repetition pattern with the factor N can support the UE beam sweeping of n UE beams, wherein 1≤n≤N. The downlink signaling may indicate which UE beam(s) is utilized to measure/detect the triggered downlink beam refinement reference signals. When the UE reports a received power/quality of a downlink beam refinement reference signal, the UE may report the symbol index on which the downlink beam refinement reference signal is measured/detected. When the UE reports that it has received multiple power/quality values from multiple downlink beam refinement reference signals, the UE may report the symbol indices where the UE measures/detects the multiple downlink beam refinement reference signals.

The UE may use the UE serving beam to measure/detect the one symbol set which is composed of the remaining symbols. Alternatively, the UE may use the UE serving beam to measure/detect the first one symbol set within the triggered measurement occasion. If the downlink signaling indicates N=1, the UE may use the UE serving beam to measure/detect the triggered downlink beam refinement reference signal. Alternatively, the downlink signaling may indicate which UE beam is utilized for measuring/detecting the triggered downlink beam refinement reference signals. The indicated UE beam for measurement/detection may not be the UE serving beam. More specifically, N=1 may mean that the network performs the network beam sweeping one time within the triggered measurement occasion. In one embodiment, $N_{symb\_trigger}^{DL}$ may be 1 or 2. More specifically, if N=1, $N_{symb\_trigger}^{DL}$ may be 1 or 2.

Figure 27:
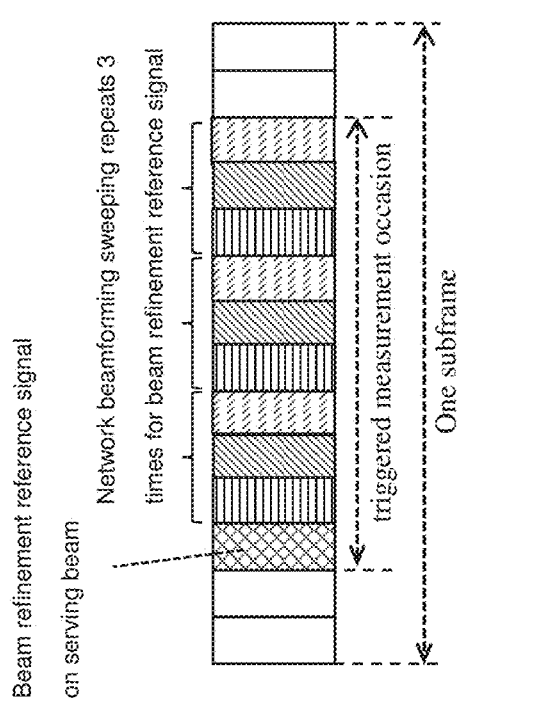
FIG. 27 illustrates one embodiment of repetition patterns for beam sweeping.

As shown in FIG. 27, one triggered measurement occasion is composed of 10 symbols, which is distributed into 4 symbol sets for downlink beam refinement reference signal. The UE may utilize the UE serving beam for measuring/detecting a downlink beam refinement reference signal on the first symbol set. For other three symbol sets, the network can perform network beam sweeping at each symbol set. More specifically, the network generates the same network beams for the downlink beam refinement reference signals on the 2nd, 5th, and 8th symbols. The network generates the same network beams for the downlink beam refinement reference signals on the 3rd, 6th, and 9th symbols. The network generates the same network beams for the downlink beam reference signals on the 4th, 7th, and 10th symbols. For different symbol sets of the downlink beam refinement reference signal, the UE can utilize different UE beams to measure/detect the downlink beam refinement reference signal transmission. For instance, as shown in FIG. 27, a UE can be supported with four UE beams sweeping.

Generally, according to KT 5G-SIG TS 5G.213 v1.9, a UE tracks downlink transmitting beams through the periodic beam reference signal measurements. The beam reference signal transmission period is configured by a 2 bit indicator in xPBCH. Therefore, the beam reference signal transmission period is common for all UEs in a cell.

In case where UEs are moving across a cell, a UE with a higher speed will need to track the downlink transmitting beams more frequently than a UE with a lower speed. Thus, the common beam reference signal transmission period should be small enough to cope with the highest speed UE. In this situation, the low speed UEs will perform beam reference signal measurements more frequently than needed, which will consume UE power unnecessarily.

It is beneficial for UEs to perform beam reference signal measurements with different periods according to their own needs. For example, a UE may measure beam reference signal with a first periodicity, which is greater than a second periodicity broadcast in the system information. The first periodicity may be determined by the UE itself or configured by a network node. The determination may be made according to UE speed or a variation of the serving beam quality (e.g., if the serving beam quality maintains at high quality for certain time, the UE may lower the first periodicity; otherwise, the first periodicity is increased).

As those skilled in the art will appreciate, the network beam(s) mentioned above may be beamformed from a network node or a TRP. Moreover, the network beam(s) mentioned above may be beamformed from multiple network nodes or multiple TRPs.

Figure 28:
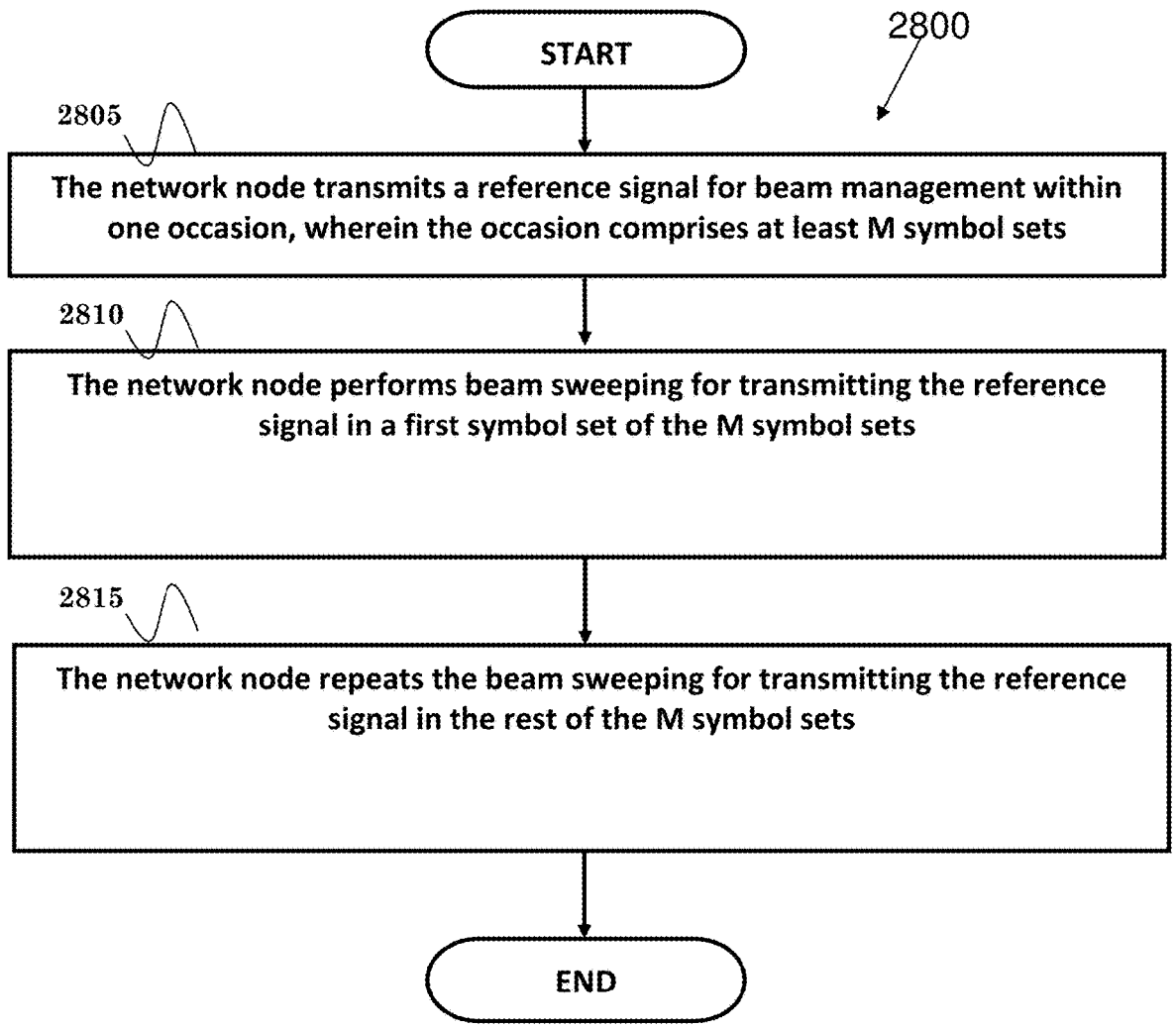
FIG. 28 is a flow diagram for one exemplary embodiment from the perspective of a network.

FIG. 28 is a flow chart 2800 according to one exemplary embodiment from the perspective of a network. In step 2805, the network node transmits a reference signal for beam management within one occasion, wherein the occasion comprises at least M symbol sets. In step 2810, the network node performs beam sweeping for transmitting the reference signal in a first symbol set of the M symbol sets. In step 2815, the network node repeats the beam sweeping for transmitting the reference signal in the rest of the M symbol sets.

In one embodiment, the beam sweeping means the network node generates at least one beam for transmission in a first symbol of a symbol set and then switches beam(s) for transmission in a second symbol of the symbol set, and so on until the last symbol of the symbol set.

In one embodiment, M is number of repetition times.

In one embodiment, the network node receives a report including a received power or quality of the reference signal from a UE. Preferably, the report includes an index associated with a symbol in which the reported received power or the reported quality of the reference signal is measured.

In one embodiment, the number of symbols in the different symbol sets are the same.

In one embodiment, the reference signal is a periodic reference signal, wherein there is at least one occasion of the reference signal every transmission period.

In one embodiment, the reference signal is an aperiodic reference signal triggered by the network node for UE measurement or UE detection.

Figure 29:
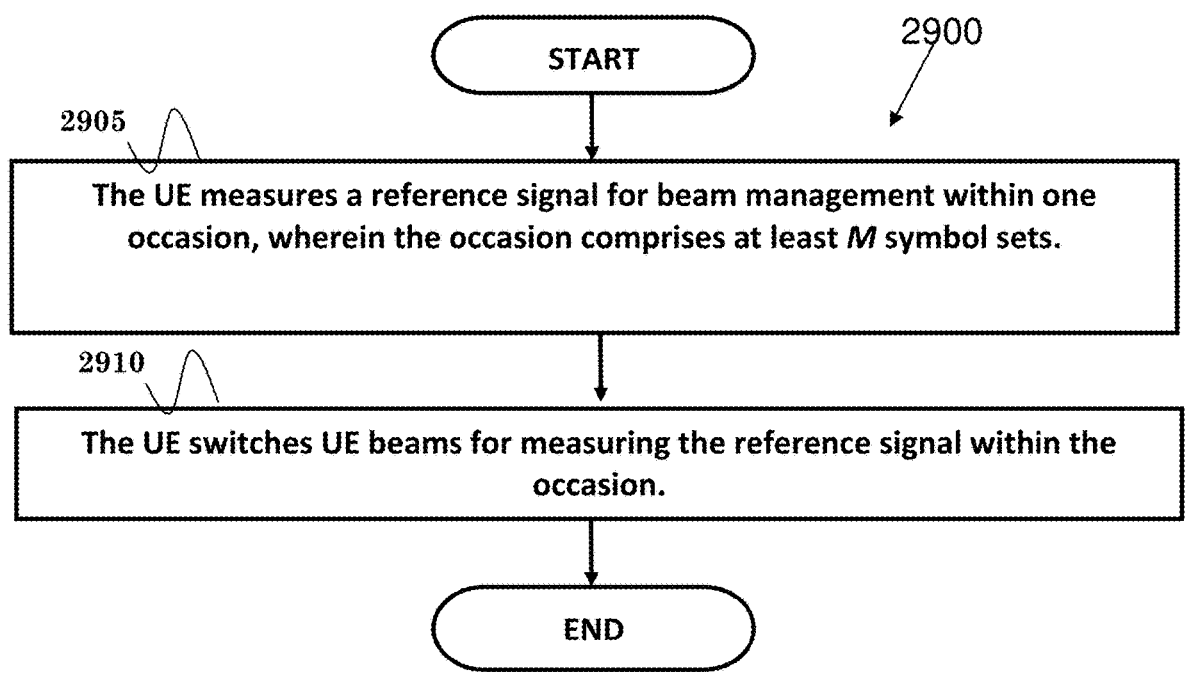
FIG. 29 is a flow diagram for one exemplary embodiment from the perspective of a UE.

FIG. 29 is a flow chart 2900 according to one exemplary embodiment from the perspective of a UE. In step 2905, the UE measures a reference signal for beam management within one occasion, wherein the occasion comprises at least M symbol sets. In step 2910, the UE switches UE beams for measuring the reference signal within the occasion.

In one embodiment, there are multiple symbols in each symbol set.

In one embodiment, M is equal to a UE beam sweeping number of the UE.

In one embodiment, the UE performs UE beam switching m times, in which $1 \leq m \leq M$.

In one embodiment, the UE utilizes at least one UE beam to measure the reference signals of a first symbol set of the M symbol sets, and the UE switches to another UE beam to measure the reference signals of a second symbol set of the M symbol sets.

In one embodiment, the number of symbols in the different symbol sets are the same.

In one embodiment, the reference signal is a periodic reference signal, wherein there is at least one occasion of the reference signal every transmission period.

In one embodiment, the reference signal is triggered via a downlink signaling wherein the one occasion of the reference signal is indicated in the downlink signaling.

In one embodiment, the UE reports a received power or quality of the reference signal, and an index associated with a symbol in which the reported received power or the reported quality of the reference signal is measured.

In one or more of the above-disclosed methods, the repetition pattern is derived/determined via a factor or number of repetition times.

In one or more of the above-disclosed methods, the repetition pattern is to distribute the symbols in the occasion into multiple symbol sets.

In one or more of the above-disclosed methods, the reference signal is periodic reference signal.

In one or more of the above-disclosed methods, there is at least one occasion of the reference signal every transmission period of the downlink reference signal.

In one or more of the above-disclosed methods, the reference signal is cell-specific, network-node specific, TRP-specific, or TRP-specific.

In one or more of the above-disclosed methods, the reference signal is beam reference signal.

In one or more of the above-disclosed methods, the fixed downlink transmitting beams are swept every the transmission period of the reference signal.

In one or more of the above-disclosed methods, the network beam sweeping repeats M times in the occasion.

In one or more of the above-disclosed methods, M is the maximum value of possible UE beam sweeping number.

In one or more of the above-disclosed methods, M is informed in system information or specified.

In one or more of the above-disclosed methods, the repetition pattern is to distribute the symbols in the occasion into at least M symbol sets.

In one or more of the above-disclosed methods, the repetition pattern is configured or specified.

In one or more of the above-disclosed methods, the network node performs the network beam sweeping at least one time within each symbol set.

In one or more of the above-disclosed methods, each of the M symbol sets does not comprise the same number of symbols. Alternatively, each of the M symbol sets comprises the same number of symbols.

In one or more of the above-disclosed methods, $N_{symb\_total}^{DL}$ is the number of symbols in the occasion.

In one or more of the above-disclosed methods, the $N_{symb\_total}^{DL}$ symbols are equally distributed to the at least M symbol sets.

In one or more of the above-disclosed methods, each of the M symbol sets comprises at least $\lfloor N_{symb\_total}^{DL}/M \rfloor$ symbols In one or more of the above-disclosed methods, the UE utilizes different UE beams to measure/detect the reference signal for different symbol sets of the reference signal.

In one or more of the above-disclosed methods, the UE utilizes at least one UE beam to measure/detect the reference signals of one symbol set. The UE then switches to another UE beam to measure/detect the reference signals of another symbol set.

In one or more of the above-disclosed methods, when the UE reports a received power/quality of a reference signal for beam management, the UE reports the symbol index on which the reference signal is measured/detected.

In one or more of the above-disclosed methods, when the UE reports multiple received power/quality from multiple reference signals for beam management, the UE reports the symbol indices where the UE measures/detects the multiple reference signals.

In one or more of the above-disclosed methods, if the UE performs UE beam sweeping with m UE beams, the UE measures/detects at least m symbol sets of the reference signals in the one occasion. Alternatively, if the UE performs UE beam sweeping with m UE beams, the UE skips measurement/detection of at most (M−m) symbol sets of the reference signals in the one occasion.

In one or more of the above-disclosed methods, if the UE is omni-directional without UE beamforming, the UE measures/detects at least one symbol set of the reference signals in the one occasion. Alternatively, if the UE is omni-directional without UE beamforming, the UE skips measurement/detection of at most (M−1) symbol sets of the reference signals in the one occasion.

In one or more of the above-disclosed methods, a symbol in the occasion comprises multiple antenna ports for multiple the reference signals.

In one or more of the above-disclosed methods, the network node may generate one network beam per one antenna port per one symbol.

In one or more of the above-disclosed methods, if $N_{symb\_total}^{DL}$ is not multiple times of M, there are some remaining symbols in the one occasion every the transmission period of the reference signal. Alternatively, if $N_{symb\_total}^{DL}$ is not multiple times of M, there are $N_{symb\_total}^{DL} - M \cdot \lfloor N_{symb\_total}^{DL}/M \rfloor$ remaining symbols in the one occasion every the transmission period of the reference signal.

In one or more of the above-disclosed methods, the remaining symbol(s) are utilized for CSI-RS transmission. Alternatively, the remaining symbol(s) are utilized for SRS transmission. n another alternative, the remaining symbol(s) are utilized for the reference signal transmission with the longer time (i.e., a time longer than one transmission period of the reference signal) to sweep the whole network's reference signal beams.

In one or more of the above-disclosed methods, the reference signal transmissions on the remaining symbol(s) are utilized for RRM measurement. Alternatively, the reference signal transmissions on the remaining symbol(s) are utilized for the measurement of other TRP(s)/network node(s). In another alternative, the reference signal transmissions on the remaining symbol(s) are utilized for one kind of measurement with the requirement that the measurement period is longer than the transmission period of the reference signal.

In one or more of the above-disclosed methods, the synchronization signals are FDMed with beam reference signal.

In one or more of the above-disclosed methods, the network beams for the beam reference signal are not the same as the network beams for the synchronization signal at the same symbol.

In one or more of the above-disclosed methods, the antenna ports for the beam reference signal are not the same as the antenna ports for the synchronization signal at the same symbol.

In one or more of the above-disclosed methods, the network node performs network beam sweeping for the synchronization signals at each symbol set.

In one or more of the above-disclosed methods, the network beam sweeping for the synchronization signals repeats M times every transmission period of the reference signal.

In one or more of the above-disclosed methods, the sequences of the synchronization signal transmitted on different symbols are the same if the synchronization signal transmissions on the different symbols are transmitted on the same antenna port or from the same network beam. Alternatively, the sequences/cyclic shifts of the synchronization signal transmitted on different symbols are different even if the synchronization signal transmissions on the different symbols are transmitted on the same antenna port or from the same network beam.

In one or more of the above-disclosed methods, the distributed multiple symbol sets for the reference signal may have the same association with the broadcast channel.

In one or more of the above-disclosed methods, the network beam sweeping for the reference signal/synchronization signal repeats multiple times, but the network beam sweeping for the broadcast channel does not repeat, i.e., sweeps one time.

In one or more of the above-disclosed methods, for the distributed M symbol sets, the different M symbols with the same network beam(s) are associated with the same symbol(s) for broadcast channel.

In one or more of the above-disclosed methods, different UEs, which detect the reference signals on different symbol sets, may receive broadcast channel on the same symbol(s).

In one or more of the above-disclosed methods, the distributed multiple symbol sets for the reference signal have the same association with the uplink transmission of the preamble.

In one or more of the above-disclosed methods, the network beam sweeping for the reference signal/synchronization signal repeats multiple times, but the network beam sweeping for receiving the preamble does not repeat, i.e., sweeps one time.

In one or more of the above-disclosed methods, for the distributed M symbol sets, the different M symbols with the same network beam(s) are associated with the same symbol(s) for the preamble.

In one or more of the above-disclosed methods, different UEs, which detect the reference signals on different symbol sets, may transmit the preamble on the same symbol(s).

In one or more of the above-disclosed methods, the occasion may be one slot, one subframe, two subframes, or four subframes.

In one or more of the above-disclosed methods, the preamble may be for random access, beam recovery, the request of aperiodic reference signal, or a scheduling preamble.

In one or more of the above-disclosed methods, the reference signal is triggered by the network node for the UE to measure/detect. Alternatively, the reference signal is triggered by downlink signaling.

In one or more of the above-disclosed methods, the reference signal is an aperiodic reference signal. In another alternative, the reference signal is a beam refinement reference signal.

In one or more of the above-disclosed methods, the occasion for the reference signal is indicated in the downlink signaling for triggering the reference signal.

In one or more of the above-disclosed methods, the triggered occasion for the reference signal comprises 5 or 10 symbols.

In one or more of the above-disclosed methods, the network performs the network beam sweeping N times within the triggered occasion.

In one or more of the above-disclosed methods, $N_{symb\_trigger}^{DL}$ is the number of symbols in the triggered occasion.

In one or more of the above-disclosed methods, the repetition pattern is to distribute the $N_{symb\_trigger}^{DL}$ symbols in the triggered occasion into at least N symbol sets.

In one or more of the above-disclosed methods, the repetition pattern is configured or specified.

In one or more of the above-disclosed methods, N is configured or indicated in the downlink signaling.

In one or more of the above-disclosed methods, the UE reports the maximum value of N to the network as a UE capability or a UE suggestion.

In one or more of the above-disclosed methods, the $N_{symb\_trigger}^{DL}$ symbols are equally distributed to the at least N symbol sets. Alternatively, the $N_{symb\_trigger}^{DL}$ symbols are not equally distributed to the at least N symbol sets.

In one or more of the above-disclosed methods, each of the N symbol sets has at least $\lfloor N_{symb\_trigger}^{DL}/N \rfloor$ symbols.

In one or more of the above-disclosed methods, if $N_{symb\_trigger}^{DL}$ is not multiple times of N, (N−1) symbol sets has the same number of symbols and one symbol set includes the remaining symbols.

In one or more of the above-disclosed methods, if $N_{symb\_trigger}^{DL}$ is not multiple times of N, (N−1) symbol sets has at least $\lfloor N_{symb\_trigger}^{DL}/N \rfloor$ symbols and one symbol set has $N_{symb\_trigger}^{DL}-(N-1)\cdot\lfloor N_{symb\_trigger}^{DL}/N \rfloor$ remaining symbols.

In one or more of the above-disclosed methods, if $N_{symb\_trigger}^{DL}$ is not multiple times of N, (N−1) symbol sets has at least $\lfloor N_{symb\_trigger}^{DL}/(N-1) \rfloor$ symbols and one symbol set has $N_{symb\_trigger}^{DL}-(N-1)\cdot\lfloor N_{symb\_trigger}^{DL}/(N-1) \rfloor$ remaining symbols.

In one or more of the above-disclosed methods, for different symbol sets of the reference signal, the UE utilizes different UE beams to measure/detect the triggered reference signal.

In one or more of the above-disclosed methods, the UE utilizes at least one UE beam to measure/detect the triggered reference signals of one symbol set. The UE then switches to another UE beam to measure/detect the triggered reference signals of another symbol set.

In one or more of the above-disclosed methods, when UE reports a received power/quality of the trigger reference signal for beam management, the UE reports the symbol index on which the reference signal is measured/detected. Alternatively, when UE reports multiple received power/quality of the triggered multiple reference signals for beam management, the UE reports the symbol indices where the UE measures/detects the multiple reference signals.

In one or more of the above-disclosed methods, the UE uses the UE serving beam for measuring/detecting the one symbol set that has the remaining symbols.

In one or more of the above-disclosed methods, the UE uses the UE serving beam for measuring/detecting the first one symbol set within the triggered occasion.

In one or more of the above-disclosed methods, if the downlink signaling indicates N=1, the UE uses the UE serving beam for measuring/detecting the triggered reference signal.

In one or more of the above-disclosed methods, the downlink signaling indicates which UE beam(s) are utilized for measuring/detecting the triggered reference signals.

In one or more of the above-disclosed methods, the indicated UE beam(s) for measuring/detecting the triggered reference signals may not be the UE serving beam.

In one or more of the above-disclosed methods, N=1 means that the network performs the network beam sweeping one time within the triggered occasion.

In one or more of the above-disclosed methods, the triggered occasion for the reference signal has 1 or 2 symbols.

In one or more of the above-disclosed methods, if N=1, the triggered occasion for the reference signal has 1 or 2 symbols.

According to another exemplary method, the UE measures/detects reference signals for beam management with a first periodicity. The reference signals are periodically transmitted with a second periodicity, wherein the first periodicity is greater than the second periodicity.

In another exemplary method, the reference signal is a beam reference signal.

In another exemplary method, the second periodicity is broadcast in the system information.

In another exemplary method, the UE adjusts/determines the first periodicity according to the UE speed.

In another exemplary method, the UE adjusts/determines the first periodicity according to the variation of the serving beam quality.

In another exemplary method, if the serving beam quality maintains a high quality for certain time period, the UE may lower the first periodicity; otherwise, the first periodicity is increased.

Referring back to FIGS. 3 and 4, in one embodiment, the device 300 includes a program code 312 stored in memory 310. The CPU 308 could execute program code 312 (i) to enable the network to transmit a reference signal for beam management within one occasion, wherein the occasion comprises at least M symbol sets, (ii) to perform beam sweeping for transmitting the reference signal in a first symbol set of the M symbol sets, and (iii) to repeat the beam sweeping for transmitting the reference signal in the rest of the M symbol sets.

In another aspect, the CPU 308 could execute program code 312 to (i) enable the UE to measure a reference signal for beam management within one occasion, wherein the occasion comprises at least M symbol sets, and (ii) and to switch UE beams for measuring the reference signal within the occasion.

Furthermore, the CPU 308 can execute the program code 312 to perform all of the above-described actions and steps or others methods described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of beam management at a user equipment (UE), the method comprising:
    measuring, by the UE, reference signals for beam management within one occasion within a single transmission period associated with the reference signals, wherein the one occasion consists of 14 orthogonal frequency-division multiplexing (OFDM) symbols and the one occasion is smaller than the single transmission period, and wherein the one occasion comprises at least M symbol sets continuously located in a time domain and at least one remaining OFDM symbol, and there are multiple symbols in each of the at least M symbol sets and the reference signals for beam management are transmitted in all of the multiple symbols; and
    wherein the UE utilizes at least one UE beam to measure the reference signals in a first symbol set of the at least M symbol sets and then switches to another UE beam to measure the reference signals in a second symbol set of the at least M symbol sets.

2. The method of claim 1, wherein M is equal to a UE beam sweeping number of the UE.

3. The method of claim 1, further comprising: performing, by the UE, m times UE beam switching, wherein $1 \leq m \leq M$.

4. The method of claim 1, wherein the number of symbols in the at least M symbol sets are the same.

5. The method of claim 1, wherein at least one of the reference signals is a periodic reference signal, wherein there is at least one occasion of the periodic reference signal every transmission period.

6. The method of claim 1, wherein at least one of the reference signals is triggered via a downlink signaling and the occasion is indicated in the downlink signaling.

7. The method of claim 1, wherein the UE reports a received power or quality of at least one of the reference signals, and an index associated with a symbol in which the reported received power or the reported quality is measured.

8. The method of claim 1, further comprising:
    receiving other downlink transmission in the at least one remaining symbol, or transmitting other uplink transmission in the at least one remaining symbol.

9. The UE of claim 8, wherein the other downlink transmission is any of Channel State Information Reference Signal (CSI-RS) transmission, reference signal transmission for Radio Resource Management (RRM) measurement, and reference signal transmission for measurement of other Transmission/Reception Points (TRPs) or network nodes.

10. The UE of claim 8, wherein the other uplink transmission is Sound Reference Signal (SRS) transmission.

11. A user equipment (UE) configured to facilitate beam management, comprising:
    a processor; and
    a memory operatively coupled to the processor, wherein the processor is configured to execute a program code to:

measure, by the UE, reference signals for beam management within one occasion within a single transmission period associated with the reference signals, wherein the one occasion consists of 14 orthogonal frequency-division multiplexing (OFDM) symbols and the one occasion is smaller than the single transmission period, and wherein the one occasion comprises at least M symbol sets continuously located in a time domain and at least one remaining OFDM symbol, and there are multiple symbols in each of the at least M symbol sets and the reference signals for beam management are transmitted in all of the multiple symbols; and wherein the UE utilizes at least one UE beam to measure the reference signals in a first symbol set of the at least M symbol sets and then switches to another UE beam to measure the reference signals in a second symbol set of the at least M symbol sets.

12. The UE of claim 11, wherein M is equal to a UE beam sweeping number of the UE.

13. The UE of claim 11, wherein the processor is further configured to execute a program code to:

perform, by the UE, m times UE beam switching, wherein $1 \leq m \leq M$.

14. The UE of claim 11, wherein the number of symbols in the at least M symbol sets are the same.

15. The UE of claim 11, wherein at least one of the reference signals is a periodic reference signal, wherein there is at least one occasion of the periodic reference signal every transmission period.

16. The UE of claim 11, wherein at least one of the reference signal is triggered via a downlink signaling and the occasion is indicated in the downlink signaling.

17. The UE of claim 11, wherein the UE reports a received power or quality of at least one of the reference signals, and an index associated with a symbol in which the reported received power or the reported quality is measured.

18. The UE of claim 11, the processor is further configured to execute a program code to:

receive other downlink transmission in the at least one remaining symbol, or transmit other uplink transmission in the at least one remaining symbol.

19. The UE of claim 18, wherein the other downlink transmission is any of Channel State Information Reference Signal (CSI-RS) transmission, reference signal transmission for Radio Resource Management (RRM) measurement, and reference signal transmission for measurement of other Transmission/Reception Points (TRPs) or network nodes.

20. The UE of claim 18, wherein the other uplink transmission is Sound Reference Signal (SRS) transmission.

* * * * *